United States Patent
Toukura et al.

[11] Patent Number: 6,016,457
[45] Date of Patent: Jan. 18, 2000

[54] VEHICLE DRIVE FORCE CONTROLLER

[75] Inventors: Nobusuke Toukura, Yokohama; Hiroshi Abe; Yoshinori Iwasaki, both of Yokosuka, all of Japan

[73] Assignee: Nissan Motor Co., Ltd., Yokohama, Japan

[21] Appl. No.: 08/974,491

[22] Filed: Nov. 19, 1997

[30] Foreign Application Priority Data

| Nov. 19, 1996 | [JP] | Japan | 8-308281 |
| Nov. 19, 1996 | [JP] | Japan | 8-308333 |
| Nov. 19, 1996 | [JP] | Japan | 8-308334 |
| Nov. 25, 1996 | [JP] | Japan | 8-313620 |
| Dec. 17, 1996 | [JP] | Japan | 8-337289 |

[51] Int. Cl.[7] ............... B60K 31/04; G06F 7/70
[52] U.S. Cl. ............... 701/70; 701/53; 701/65; 701/55; 701/56; 342/450; 342/451; 342/359; 180/167; 180/197; 340/995
[58] Field of Search ............... 701/70, 53, 65, 701/55, 56; 180/167, 197; 340/995, 905; 342/450, 451, 359

[56] References Cited

U.S. PATENT DOCUMENTS

| 5,485,892 | 1/1996 | Fujita | 180/167 |
| 5,539,643 | 7/1996 | Yamamoto et al. | 701/53 |
| 5,576,960 | 11/1996 | Maeda | 701/53 |
| 5,644,488 | 7/1997 | Ito et al. | 180/197 |
| 5,699,056 | 12/1997 | Yoshida | 340/905 |
| 5,832,400 | 11/1998 | Takahashi et al. | 701/53 |

FOREIGN PATENT DOCUMENTS 5-180023  7/1993  Japan.

*Primary Examiner*—William A. Cuchlinski, Jr.
*Assistant Examiner*—Olga Hernandez
*Attorney, Agent, or Firm*—Foley & Lardner

[57] ABSTRACT

A regional attribute for a region in which a vehicle is traveling is detected by a vehicle navigation device, and vehicle drive force characteristics such as a throttle gain of an electronic throttle or a speed change pattern of an automatic transmission are modified according to the regional attribute. An operation amount of an accelerator operated by a driver is detected, and by not modifying the drive force characteristics when the accelerator operation amount is not zero, abrupt change of drive force is avoided, and the sense of discomfort experienced by a driver due to abrupt change of drive force is eliminated.

21 Claims, 28 Drawing Sheets

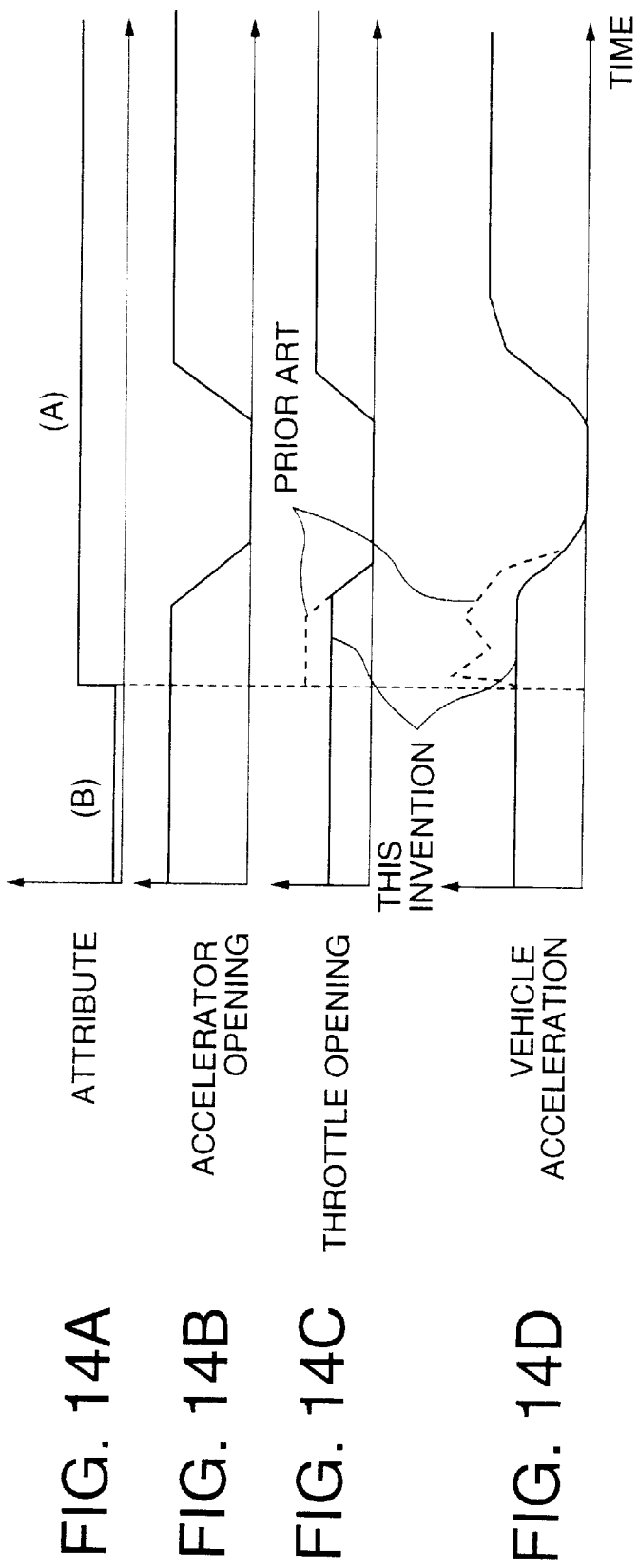

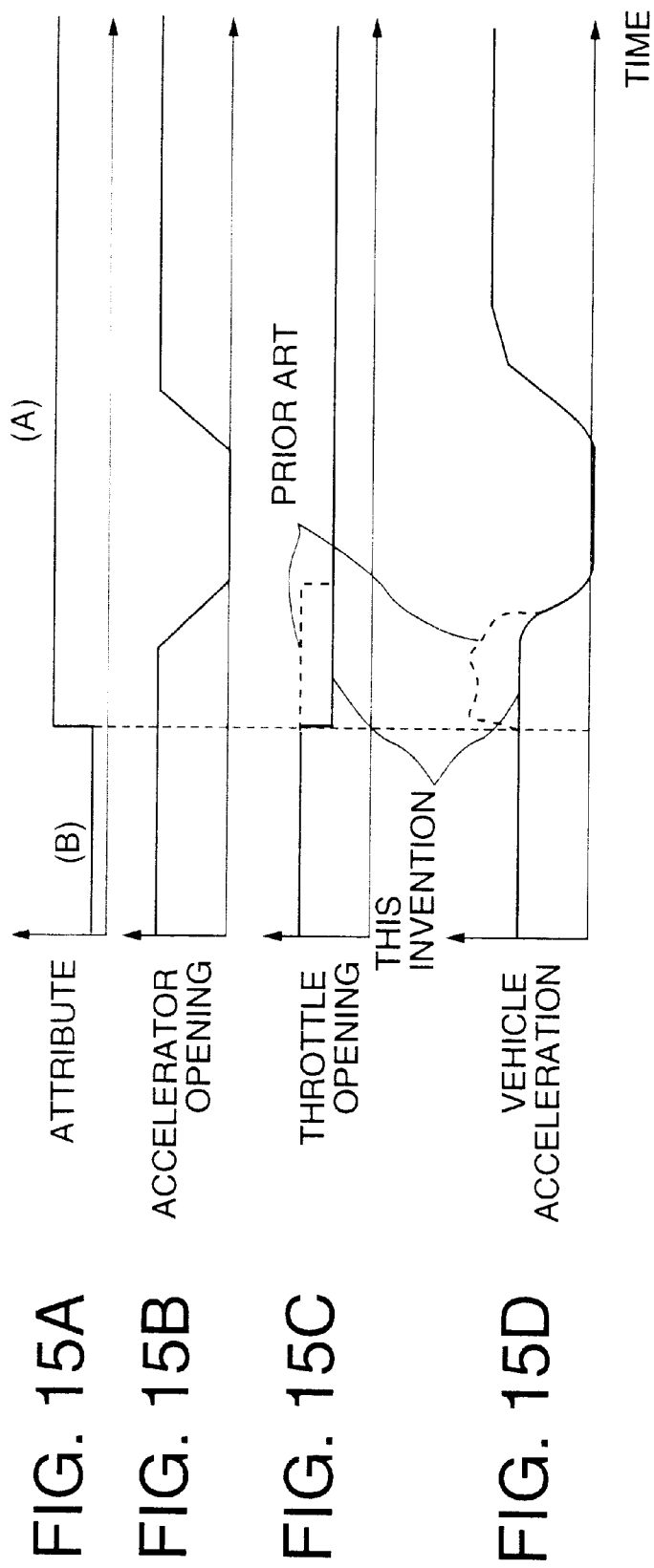

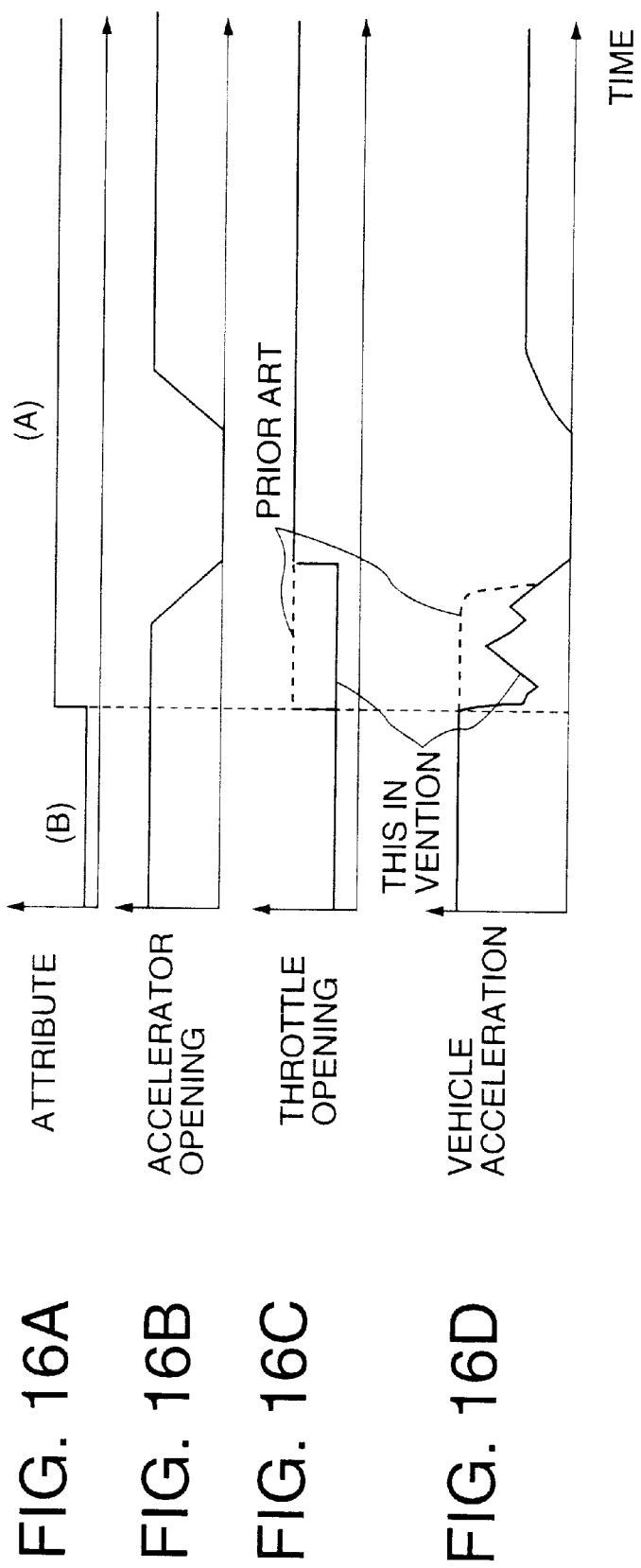

VEHICLE DRIVE FORCE CONTROLLER

FIELD OF THE INVENTION

This invention relates to the control of driving force of a vehicle, and in particular, to the control of driving force according to regional attributes of vehicle running conditions.

BACKGROUND OF THE INVENTION

Examples of devices which vary the travel characteristics of a vehicle according to a driver operation amount comprise power steering systems which adjust a steering weight, an electronic control throttle of an engine of which a target opening can be varied according to an accelerator opening, an electronic control transmission which varies speed change characteristics, a traction control system which varies a traction of front and rear wheels, and a four-wheel steering system which varies the ratio of a rear wheel steering angle relative to a front wheel steering angle.

In these devices, the driver selects a preferred mode by suitably operating control switches provided in front of the driver's seat so as to manually vary travel characteristics according to road conditions, etc.

Due to diversification of travel preferences in recent years and to various kinds of innovation, these devices are diversifying so that the number of travel characteristics to be set is increasing, and as a result, the number of switches for setting travel characteristics is also continually increasing. It is very complicated for a driver to manipulate all these control switches, and as it is also difficult to operate control switches while vehicle is traveling, it often occurred that the superior functions of travel characteristic modifying devices were not fully utilized.

In order to avoid such a complication, a drive force controller which automatically controls an engine output of a vehicle according to road conditions obtained from a navigation device using a global positioning system (GPS) is disclosed, for example, in Tokkai Hei 5-180023 published by the Japanese Patent Office in 1993.

In this device, when for example the navigation detects that the vehicle is traveling along a narrow road or winding road, the engine output is decreased accordingly.

However if the drive force characteristics change according to the road conditions, the drive force of the vehicle may change abruptly and the speed will suddenly decrease or increase, even if the driver maintains a constant accelerator pedal depression amount.

When the vehicle is traveling in an urban area, the travel speed is relatively low, but a quick response is often necessary. In this case, the drive force may be insufficient due to decrease the engine output.

When road conditions improve, the drive force increases even in a traffic jam, but increase of drive force in a traffic jam actually makes driving more difficult.

Also, under conditions when a large drive force is required even if there are bends such as on a mountain road, decreasing the drive force leads to inadequate hill climbing ability.

Conditions such as these make the driver uncomfortable, and contribute to making driving more difficult.

SUMMARY OF THE INVENTION

It is therefore an object of this invention to adjust vehicle drive force characteristics not only to road conditions or regional attributes during travel, but also to various running conditions of the vehicle.

In order to achieve the above object, this invention provides a vehicle drive force controller wherein drive force characteristics of a vehicle are modified according to a regional attribute of a region in which the vehicle is traveling.

The controller comprises a navigation device for detecting the regional attribute of the region in which the vehicle is traveling, an accelerator operation amount sensor for detecting an operation amount of an accelerator operated by a driver, a microprocessor, and a drive force control device for controlling a drive force of the vehicle according to the drive force characteristics determined by the microprocessor. The microprocessor is programmed to determine whether or not the accelerator operation amount is zero, and determine the drive force characteristics such that the drive force characteristics are modified according to a change of the regional attribute when the accelerator operation amount is zero, and that the drive force characteristics are not modified when the accelerator operation amount is not zero.

It is preferable that the drive force control device comprises an electronic throttle for varying an engine output at a predetermined throttle gain relative to the accelerator operation amount, and the drive force characteristics comprise the throttle gain.

It is also preferable that the drive force control device comprises an automatic transmission for transmitting an engine rotation according to a predetermined speed change pattern, and the drive force characteristics comprise the speed change pattern.

It is also preferable that the drive force control device comprises a device for modifying an engine air-fuel ratio, and the drive force characteristic comprise the air-fuel ratio.

This invention also provides a vehicle drive force controller comprising a navigation device for determining whether or not the vehicle is traveling in an urban area, an automatic transmission for transmitting an engine rotation at a predetermined speed change pattern, and a microprocessor programmed to modify the speed change pattern such that a lower gear is applied when the vehicle is travelling through an urban area than when the vehicle is not traveling through an urban area.

It is preferable that the navigation device comprises a global positioning system for detecting a present position of the vehicle, and a memory for storing a map for determining whether or not the present position is in an urban area.

It is also preferable that the microprocessor modifies the speed change pattern such that the highest gear of the automatic transmission is not used when the vehicle is traveling through an urban area.

This invention also provides a vehicle drive force controller comprising a sensor for detecting a traveling condition of the vehicle, a microprocessor programmed to determine whether or not the vehicle is in a traffic jam based on the traveling condition, determining the drive force characteristics by modifying the characteristics based on a change of the regional attribute when the vehicle is not traveling in a traffic jam, and prohibiting modification of the characteristics when the vehicle is traveling in a traffic jam, and a drive force control device for controlling a drive force of the vehicle according to the drive force characteristics determined by the microprocessor.

It is preferable that the sensor comprises an optical recognition device for detecting whether or not there is another vehicle in front of the vehicle, and the microprocessor is programmed to determine whether or not the vehicle is traveling in a traffic Jam based on an output signal from the optical recognition device.

It is also preferable that the sensor comprises a sensor for detecting an operating frequency of an accelerator operated by a driver, and the microprocessor is programmed to determine that the vehicle is traveling in a traffic jam when the accelerator operating frequency is greater than a predetermined value.

It is also preferable that the sensor comprises a sensor for detecting an operating frequency of a brake operated by a driver, and the microprocessor is programmed to determine that the vehicle is traveling in a traffic jam when brake operating frequency is greater than a predetermined value.

It is also preferable that the sensor comprises a device for receiving information relating to the location of traffic jams emitted from outside the vehicle and a device for detecting a present position of the vehicle, and the microprocessor is programmed to determine whether or not the vehicle is traveling is a traffic jam by comparing the present position of the vehicle with the information relating to the location of traffic jams.

It is also preferable that the drive force control device comprises an electronic throttle for varying an engine output at a predetermined throttle gain relative to an accelerator operation amount, and the drive force characteristics comprise the throttle gain.

It is also preferable that the drive force control device comprises an automatic transmission for transmitting an engine rotation according to a predetermined speed change pattern, and the drive force characteristics comprise the speed change pattern.

It is also preferable that the drive force control device comprises a device for modifying an engine air-fuel ratio, and the drive force characteristics comprise the air-fuel ratio.

This invention also provides a vehicle drive force controller comprising a navigation device for determining whether or not the vehicle is traveling in a mountainous area, a microprocessor programmed to determine the vehicle drive force characteristics depending on whether or not the vehicle is traveling in a mountainous area, and a drive force control device for controlling a drive force of the vehicle according to the drive force characteristics determined by the microprocessor.

It is preferable that the navigation device comprises a global positioning system for detecting a present position of the vehicle, and a memory for storing a map for determining whether or not the present position is situated in a mountainous area.

It is also preferable that the microprocessor is programmed to determine the drive force characteristics such that a larger vehicle drive force is obtained when the vehicle is traveling in a mountainous area than when the vehicle is not traveling in a mountainous area.

It is also preferable that the drive force control device comprises an electronic throttle for varying an engine output at a predetermined throttle gain relative to an accelerator operation amount, and the microprocessor is programmed to select a throttle gain set such that an opening of the electronic throttle is larger when the vehicle Is traveling through a mountainous area than when the vehicle is not traveling through a mountainous area.

It is also preferable that the drive force control device comprises an automatic transmission for transmitting an engine rotation according to a predetermined speed change pattern, and the microprocessor is programmed to modify the speed change pattern set so that a lower gear is applied when the vehicle is traveling through a mountainous area than when the vehicle is not traveling through a mountainous area.

This invention also provides a vehicle drive force controller comprising a navigation device comprising a global positioning system for detecting a present position of the vehicle, and a memory for storing altitude data for an area surrounding the present position, a microprocessor programmed to calculate a slope of a road on which the vehicle is traveling from the altitude data for the area surrounding the present position, select drive force characteristics for a mountainous area when the slope is equal to or greater than a predetermined value, select drive force characteristics different from those for a mountainous area when the slope is less than the predetermined value, and a drive force control device for controlling a drive force of the vehicle according to the drive force characteristics selected by the microprocessor.

It is preferable that the drive force control device comprises an electronic throttle for varying an engine output at a predetermined throttle gain relative to an accelerator operation amount, the drive force characteristics comprise the throttle gain, and the microprocessor is programmed to select a throttle gain set such that an opening of the electronic throttle is larger when the slope is equal to or greater than a predetermined value than when the slope is less than the predetermined value.

It is also preferable that the drive force control device comprises an automatic transmission for transmitting an engine rotation according to a predetermined speed change pattern, the drive force characteristics comprise the speed change pattern, and the microprocessor is programmed to select a speed change pattern set so that a lower gear is applied when the slope is equal to or greater than a predetermined value than when the slope is less than the predetermined value.

This invention also provides a vehicle drive force controller comprising a navigation device for detecting the regional attribute of the region in which the vehicle is traveling, an accelerator operation amount sensor for detecting an operation amount of an accelerator operated by a driver, a microprocessor programmed to calculate a target value of a throttle gain based on the regional attribute, calculate a new throttle gain obtained by adding a predetermined amount to a present throttle gain such that the present throttle gain approaches the target value in steps, and an electronic throttle for varying an engine output based on the new throttle gain.

It is preferable that the navigation device comprises a global positioning system for detecting a present position of the vehicle, and a memory for storing a map for determining a regional attribute of the present position.

It is also preferable that the microprocessor is further programmed not to perform calculation of the new throttle gain when an accelerator operation amount is not zero.

It is also preferable that the microprocessor is further programmed to calculate the new throttle gain once each time the accelerator operation amount becomes zero.

It is also preferable that the controller further comprises an automatic transmission for transmitting an engine rotation according to a predetermined speed change pattern, and the microprocessor is further programmed to vary the speed change pattern according to the regional attribute.

The details as well as other features and advantages of this invention are set forth in the remainder of the specification and are shown in the accompanying drawings.

BRIEF DESCRIPTION OF THE DRAWINGS

FIGS. 14A–14D are timing charts describing changes of an accelerator operation amount, throttle opening and vehicle acceleration when there is a change of regional attribute according to the first embodiment of this invention.

FIGS. 15A–15D are timing charts describing changes of an accelerator operation amount, gear position and vehicle acceleration when there is a change of regional attribute according to the second embodiment of this invention.

FIGS. 16A–16D are timing charts describing changes of an accelerator operation amount, target air-fuel ratio and vehicle acceleration when there is a change of regional attribute according to the third embodiment of this invention.

DESCRIPTION OF THE PREFERRED EMBODIMENTS

Figure 1:
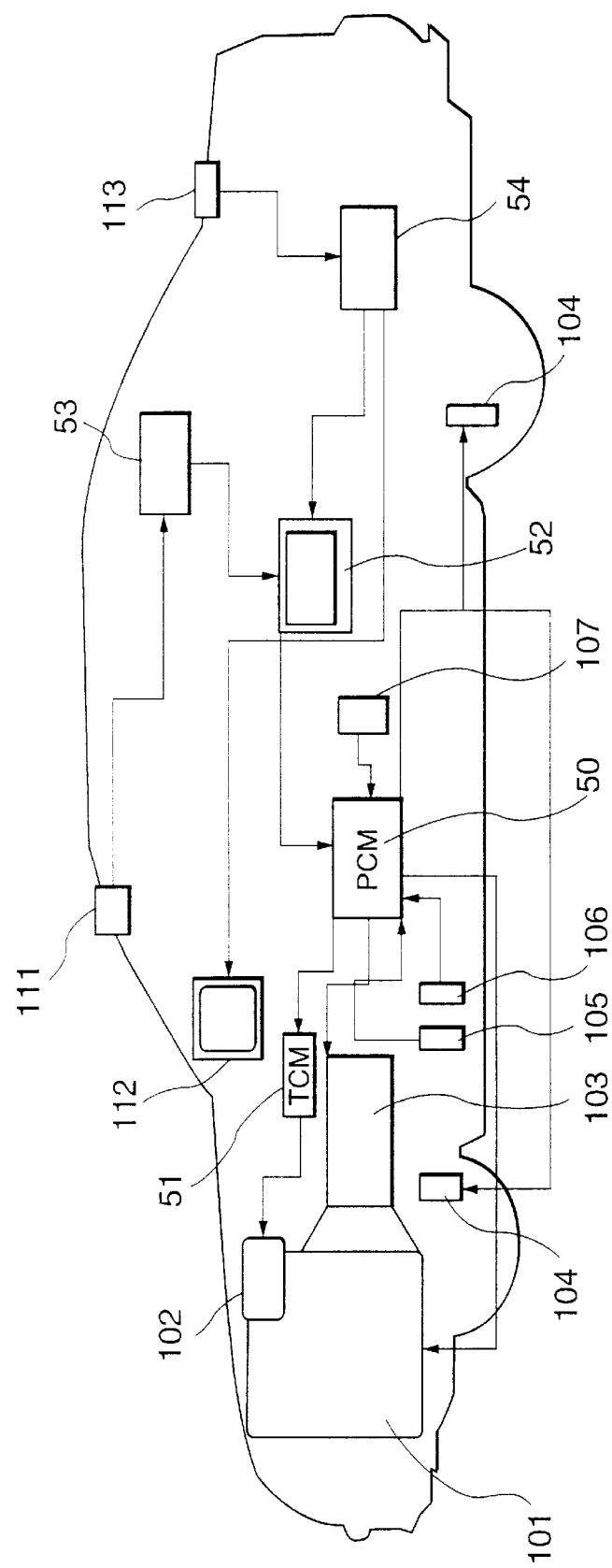
FIG. 1 is a schematic diagram of a drive force controller according to this invention.

Referring to FIG. 1 of the drawings, an output of an engine 101 of a vehicle is transmitted to drive wheels via an automatic transmission 103 comprising a torque converter.

An electronic control throttle 102 that it is opened and closed by a motor or the like, is installed in an intake passage of the engine 101. An intake air volume of the engine 101 varies according to an opening of the electronic control throttle 102, and the output torque of the engine 101 varies accordingly. The electronic control throttle 102 operates according to a control signal from a throttle control module (abbreviated hereafter as TCM) 51.

An opening command signal commanding an opening of the electronic control throttle 102 is output from a power train control module (abbreviated hereafter as PCM) 50 to the TCM 51. The TCM 51 converts this opening command signal to a motor drive voltage, and feedback controls the electronic control throttle 102 so that the opening of the throttle valve 102 coincides with the opening command signal from the PCM 50.

An accelerator pedal operation amount from an accelerator pedal operation amount sensor 105, a brake operation signal from a brake operation switch 106, and a select range signal from a range selection lever 107 of an automatic transmission 103 are input to the PCM 50. Based on these input signals, the PCM 50 performs control of a fuel supply to the engine 101, control of the ignition timing of the engine 101, gear position control or oil pressure control of the automatic transmission 103, and control of wheel brake hydraulic pressure of a brake actuator 104.

A camera 111 for photographing the situation in front of the vehicle is disposed above the windshield of the vehicle. An image photographed by the camera 111 is input to an image processing unit 53, and information such as road conditions in front of the vehicle, traffic and obstacles, etc., is transmitted to an external environment information processing module 52.

A GPS antenna 113 for receiving output signals from satellites for a global positioning system (GPS), is disposed at the rear of the vehicle.

A signal from the GPS antenna 113 is input to a position information processing module 54. The position information processing module 54 comprises GPS receiver which converts signals from the GPS antenna 113 into information, and a recording medium such as a CD-ROM for storing map information into which regional attributes or the like are previously built in. Based on this map information and a signal from the GPS antenna 113, the position information processing module 54 detects a current position of a vehicle on a map. This detection result is transmitted to the external environment information processing module 52. The current position is also indicated together with the map on a monitor 112 in front of the driver's seat.

Based on a signal input from the image processing unit 53 and position information processing module 54, the external environment information processing module 52 transmits a signal representing the current environment of the vehicle to the PCM 50. The PCM 50 receives this signal, and controls the output of engine 101 or speed change of the automatic transmission 103 accordingly.

The PCM 50 also outputs information such as torque information from the engine 101, gear position information from the automatic transmission 103, a signal from the accelerator pedal operation amount sensor 105 and a signal from the brake operation switch 106 to the external environment information processing module 52. The external environment information processing module 52 uses this information for enhancing the determining precision of the external environment, or evaluating the psychological state of the driver.

Of the above processes, the drive force control process will now be described referring to FIGS. 2, 3 and 5.

Figure 2:
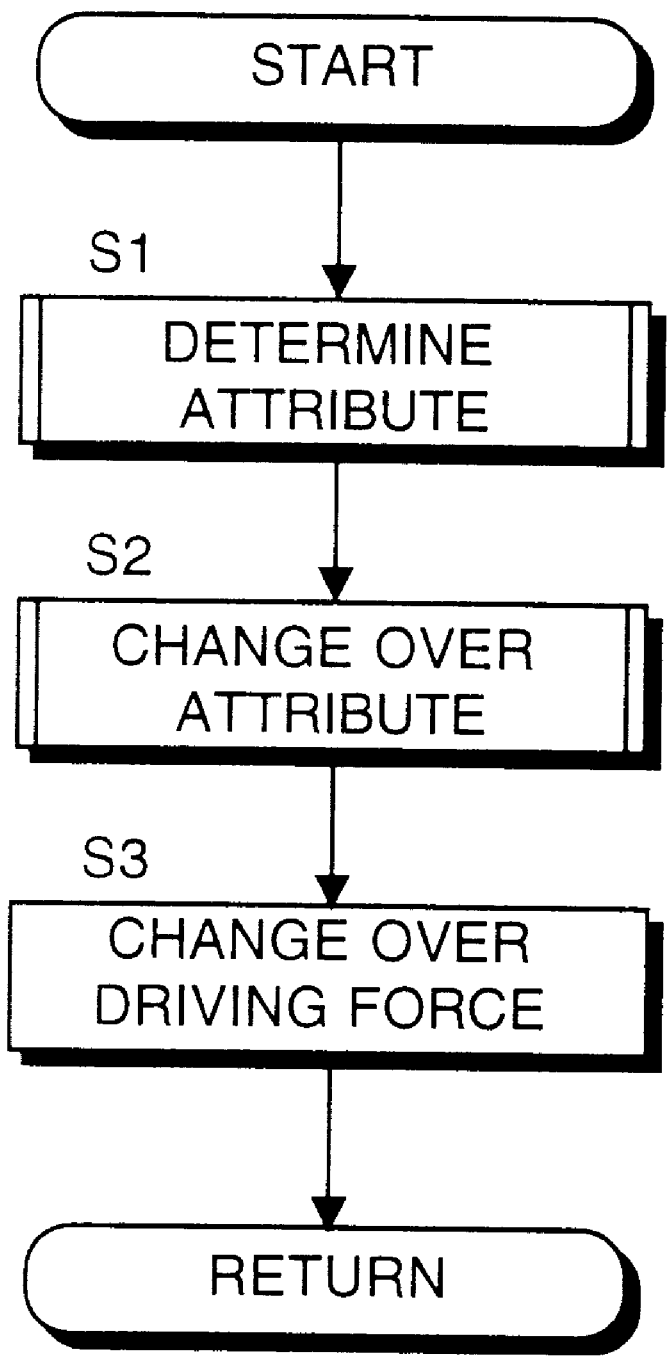
FIG. 2 is a flowchart explaining a change-over process of drive force characteristics performed by the drive force controller.

The flowchart of FIG. 2 describes an overall flow of the drive force control.

This process is executed at an interval of, for example, ten milliseconds.

At first in a step S1, the position information processing module 54 determines an attribute of the region where the vehicle is currently traveling. For example, as shown in FIG. 4B, regional attributes are classified as attribute A (urban areas), attribute B (ordinary traveling conditions) and attribute C (mountainous ground), and this classification is previously stored as part of the map data on the storage medium in the position information processing module 54.

Figure 3:
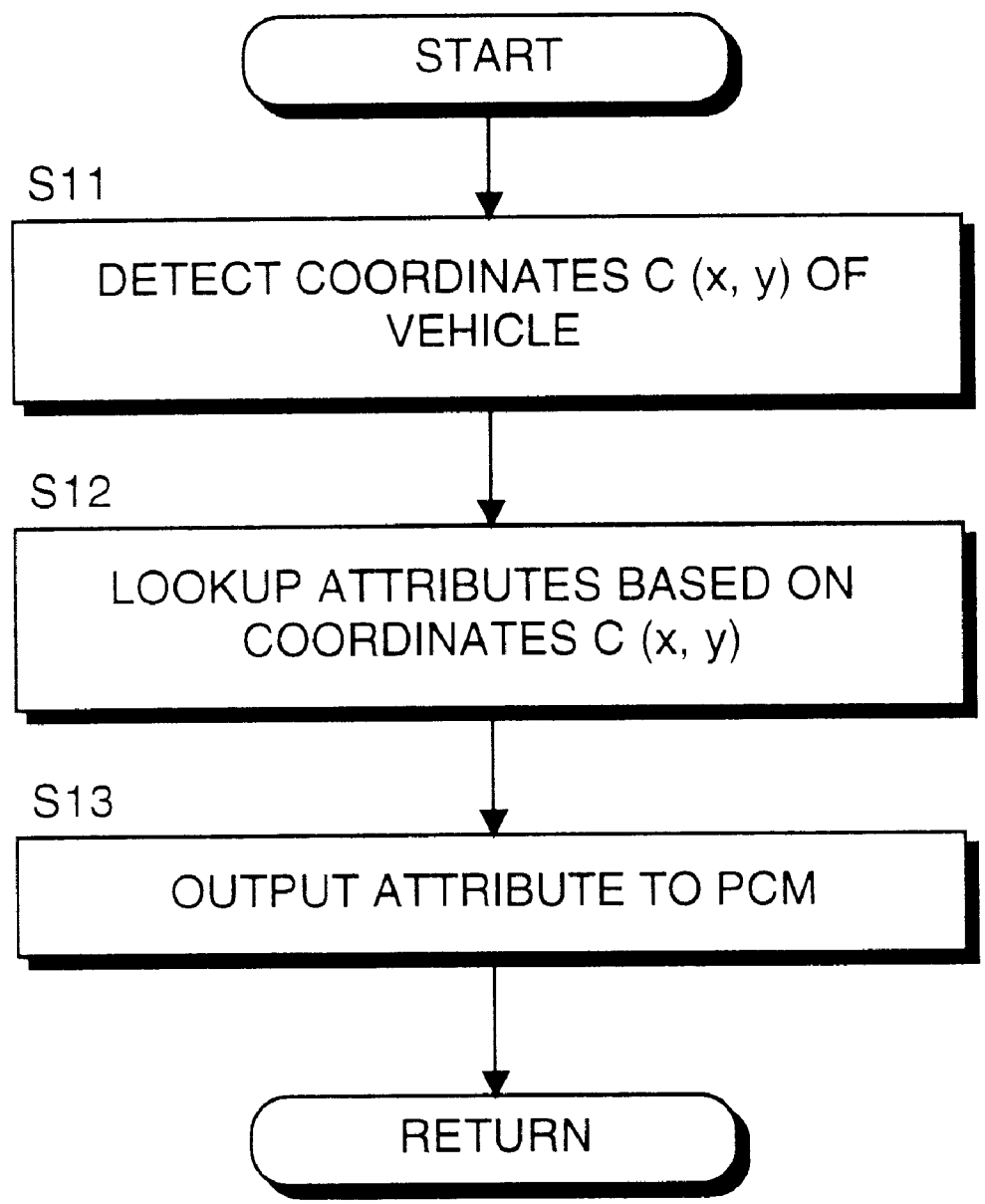
FIG. 3 is a flowchart explaining a regional attribute determining process performed by the drive force controller.

This regional attribute determination is performed by a subroutine of FIG. 3.

First, in a step S11, the position information processing module 54 detects position coordinates C(x,y) of the vehicle on a map based on the signal from the GPS antenna 113. Based on these coordinates, the road on which the vehicle is running is detected, as shown in FIG. 4A.

In a step S12, by comparing with the map data stored on the recording medium, the position information processing module 54 determines which attribute the position coordinates C(x,y) belong to of the regional attributes mentioned above (urban areas, non-urban areas, etc.).

Figure 4A:
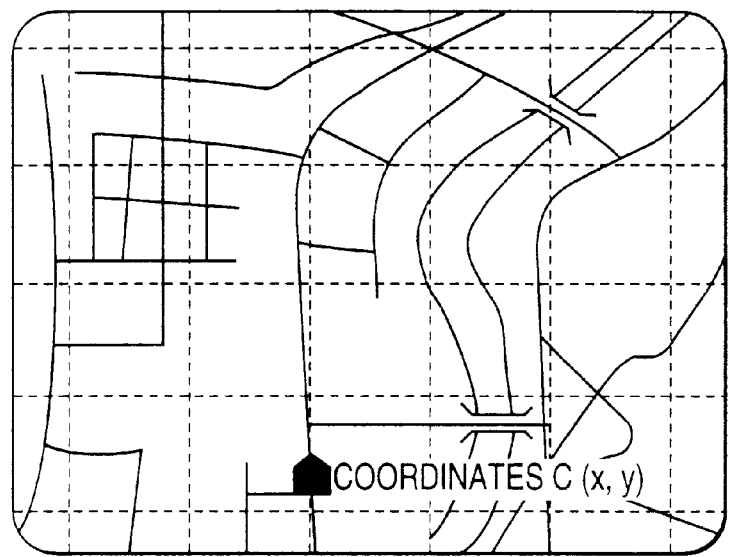
FIGS. 4A and 4B are schematic representations of a monitor display of a navigation device.
Figure 4B:
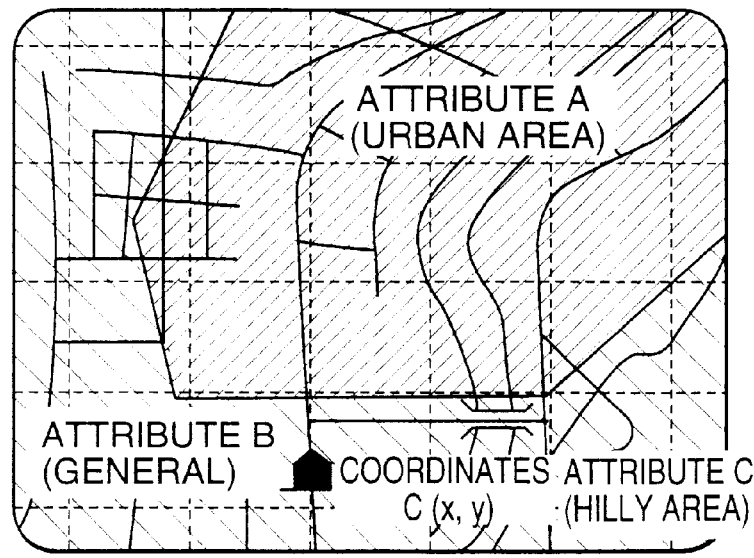

For example, when the coordinates C(x,y) correspond to a position shown in FIGS. 4A and 4B, it is determined that they belong to attribute B (ordinary traveling conditions).

The determination result is transmitted to the external environment processing module 52 from the position information processing module 54.

In a step S13, the external environment information processing module 52 transmits a signal showing the regional attribute to the PCM 50, and the subroutine is terminated.

After the processing of the step S1 is terminated in this way, In a step S2, the PCM 50 performs regional attribute change-over processing. This processing is performed according to a subroutine shown in FIG. 5.

Figure 5:
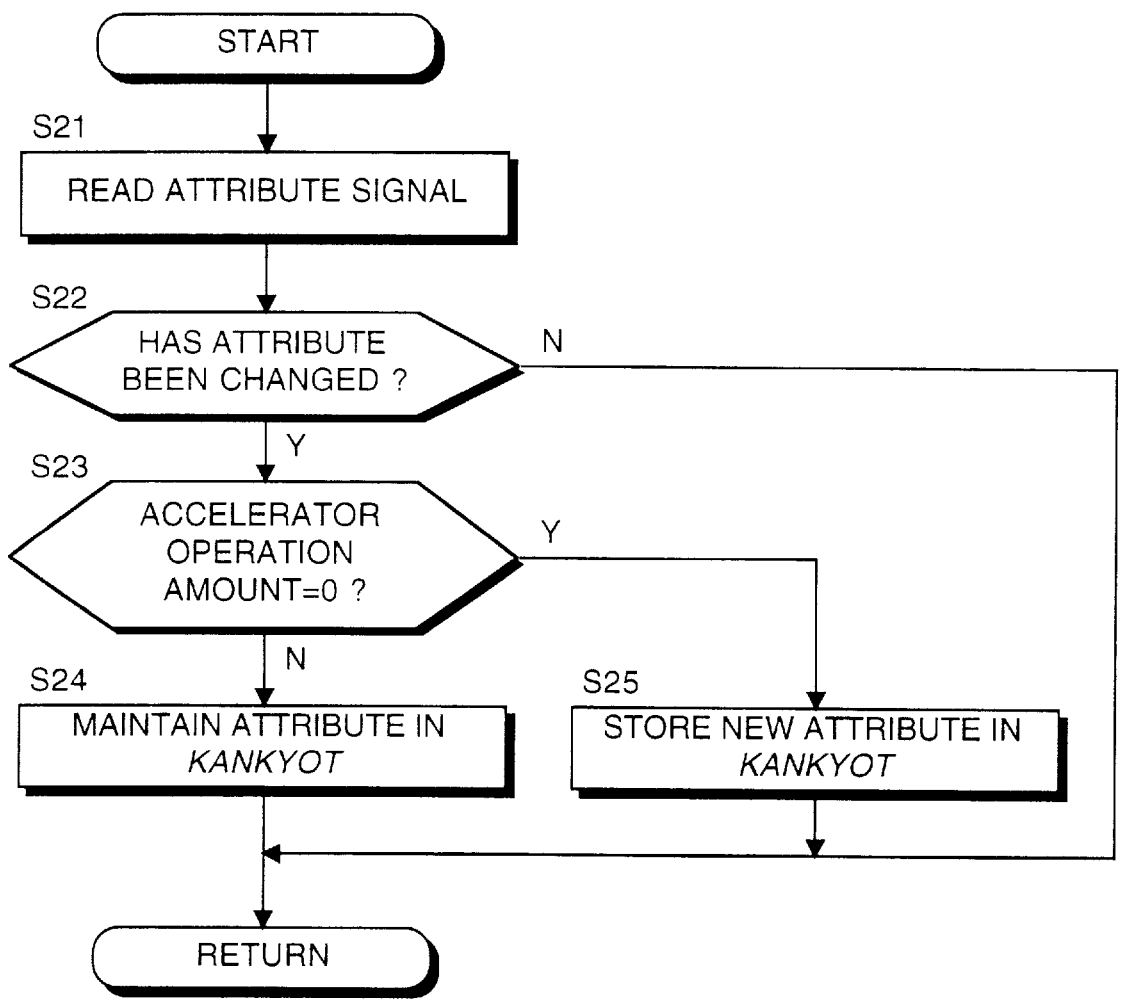
FIG. 5 is a flowchart describing a regional attribute change-over process performed by the drive force controller.

First referring to FIG. 5, in a step S21, the PCM 50 reads a regional attribute signal input from the external environment information processing module 52.

In a step S22, it is determined whether or not the regional attribute input in the step S1 is identical to the regional attribute input on the immediately preceding occasion when the process was executed. For this purpose, the PCM 50 comprises a memory KANKYOT for storing that regional attributes. When the regional attribute is the same, the process is terminated. In this case, the regional attribute stored in KANKYOT is not modified. When the regional attribute is not the same, the routine proceeds to a step S23.

In a step S23, based on the input signal from the accelerator pedal operation amount sensor 105, it is determined whether or not the accelerator operation amount is zero. When the accelerator operation amount is zero, the routine proceeds to a step S25, and when the accelerator operation amount is not zero, the routine proceeds to a step S24.

In the step S24, the regional attribute stored in the memory KANKYOT on the immediately preceding occasion when the routine was executed is maintained, and the process is terminated.

In the step S25, the stored contents of the memory KANKYOT are updated by the regional attribute input in the step S21 and the process is terminated.

Hence, after the processing of the step 2 of FIG. 3 is complete, in the next step S3, the PCM 50 issues a vehicle drive force change-over command, based on the stored contents of the memory KANKYOT, for changing the drive force control process that is being executed in the background.

As is clear from the above process, in this vehicle drive force controller, even when the regional attribute changes and an accelerator operation is performed, the regional attribute in the process that was executed on the immediately preceding occasion is applied, and therefore, there is no abrupt change of drive force and sudden vehicle speed change contrary to the driver's intentions during accelerator operation. Further, when the driver is aware of a change of regional attribute from the display on the monitor 112, he can change the drive force characteristics of the vehicle to a new regional attribute by returning the accelerator operation amount to zero. In other words, change-over of drive force characteristics is performed with a tiling in accordance with the driver's intentions.

Figure 6:
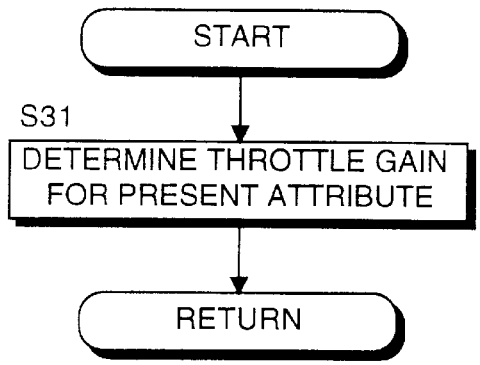
FIG. 6 is a flowchart explaining a throttle gain setting process performed by the drive force controller.
Figure 7:
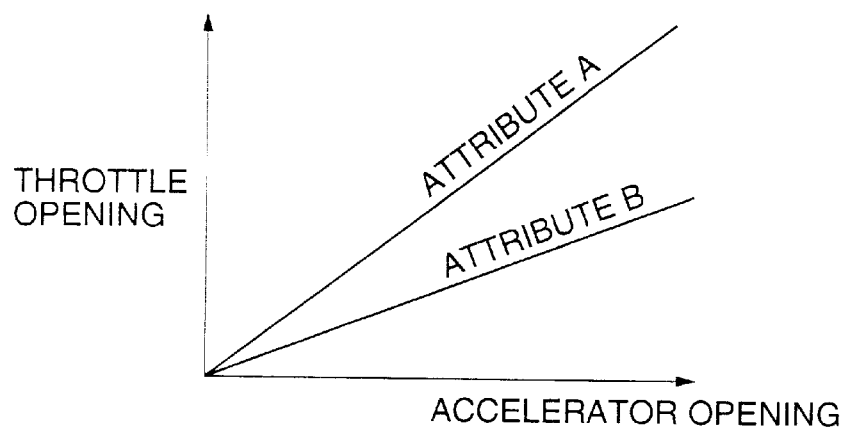
FIG. 7 is a graph showing throttle gain characteristics set by the drive force controller.

Next, referring to FIGS. 6, 7, 14A–14D, the change-over of drive force characteristics performed by the PCM 50 will be explained. FIG. 6 shows a drive force characteristic change-over process due to a change of throttle gain. Drive force control is itself executed in the background, but as a vehicle drive force change-over command is issued every 10 milliseconds as described hereabove, this change-over process is also executed at an interval of 10 milliseconds. In a step S31, the PCM 50 changes a magnification TVOG of the throttle opening signal relative to the signal from the accelerator operation amount sensor 105 according to the regional attribute information stored in the memory KANKYOT described above. For example, as shown in FIG. 7, the magnification TVOG is set larger for the attribute A corresponding to urban areas than for the attribute B corresponding to non-urban areas.

Due to this, the change of engine output torque relative to change of throttle opening is made large when the vehicle is traveling in an urban region. As a result, a good driving response is obtained when accelerating and decelerating in urban regions. For example, a desirable mobility is obtained for evading people or cars which jump out from side roads.

The result of the above-mentioned control is shown by the timing charts of FIGS. 14A–14D. In these figures, the solid line corresponds to this invention, and the broken line corresponds to the aforesaid prior art example.

When the regional attribute is changed in the prior art example, the magnification TVOG is changed regardless of accelerator operation. When the magnification TVOG is varied in the increase direction, the vehicle speed increases, and as the acceleration G of the vehicle varies largely contrary to the driver's intentions, the driver tends to experience discomfort.

On the other hand, according to this invention, a change of the magnification TVOG is not performed until the accelerator operation amount is 0. Due to this arrangement the change-over of drive force is performed according to the driver's intention.

FIGS. 7–9, 15A–15D show a second embodiment of this invention relating to drive force characteristics change-over processing. According to this embodiment, the PCM 50 controls drive force by modifying the speed change pattern of the automatic transmission 103, instead of controlling the throttle gain as in the first embodiment.

Figure 9:
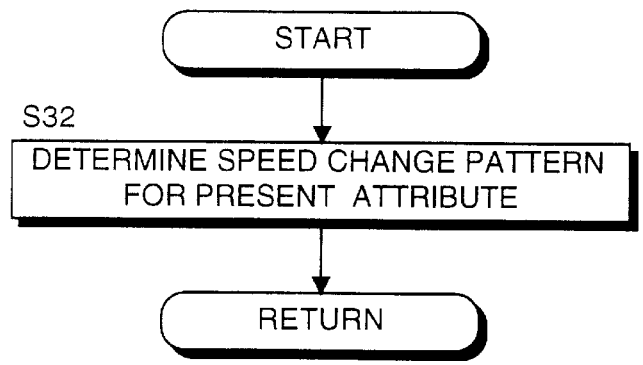
FIG. 9 is a flowchart explaining a speed change pattern setting process according to the second embodiment.
Figure 10:
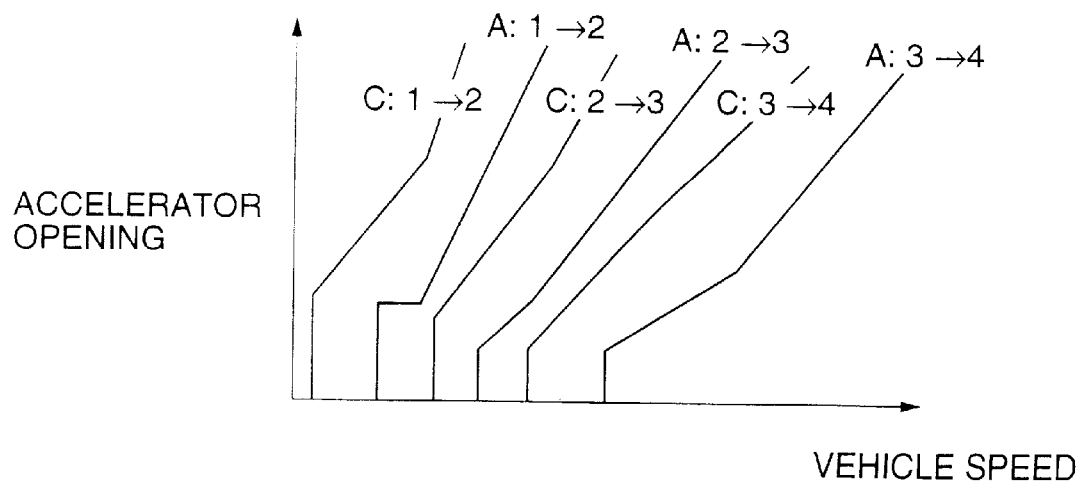
FIG. 10 is a diagram showing a speed change pattern according to the second embodiment.
Figure 8:
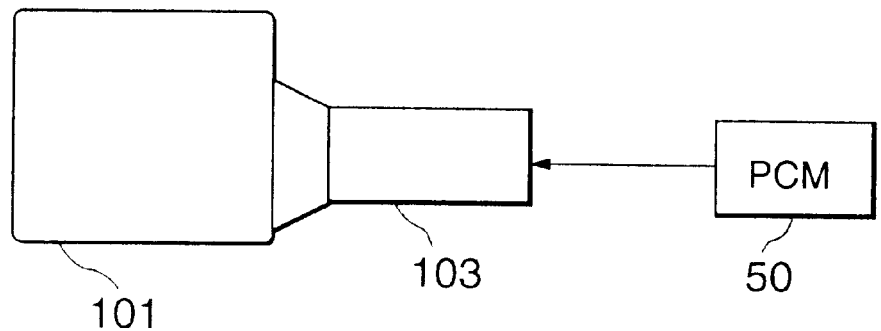
FIG. 8 is a schematic diagram of the essential parts of a drive force controller according to a second embodiment of this invention.

For this purpose, the process shown in FIG. 9 is used instead of the process shown in FIG. 6 for changing over drive force characteristics which is performed by the PCM 50 in the background. In a step S32 of FIG. 9, a speed change pattern is applied according to a regional attribute stored in the memory KANKYOT. A speed change ratio of the automatic transmission 103 is changed by a change-over signal output by the PCM 50 according to the accelerator opening and traveling speed. The speed change pattern that specified this change-over timing according to the accelerator opening and traveling speed, is previously stored in the PCM 50. According to this embodiment, two kinds of pattern are stored, i.e. a patterns for attribute A corresponding to an urban region, and a pattern for attribute C corresponding to a mountainous region, as shown in FIG. 10. Compared to the pattern for attribute A, the pattern for attribute C is set so that a lower gear is used for the same vehicle speed and the same accelerator opening. Due to this, in the attribute C region, more drive force is available for each gear than in the attribute A region, and drive force characteristics suited to climbing up hills are obtained. The result of control according to the second embodiment is shown in FIGS. 15A–15D. The solid line in the figures corresponds to this embodiment, and the broken line is equivalent to the aforesaid prior art example.

According to the prior art, when the regional attribute was changed, the speed change pattern was changed regardless of accelerator operation. When for example, a gear shift down was performed, the acceleration G of the vehicle changed although the accelerator operation amount did not change, and the driver experienced a sense of discomfort. According to the second embodiment of this invention, however, the speed change pattern is not changed until the accelerator operation amount is 0.

Due to this arrangement, the change-over of drive force characteristics takes place in accordance with the driver's intentions.

Figure 11:
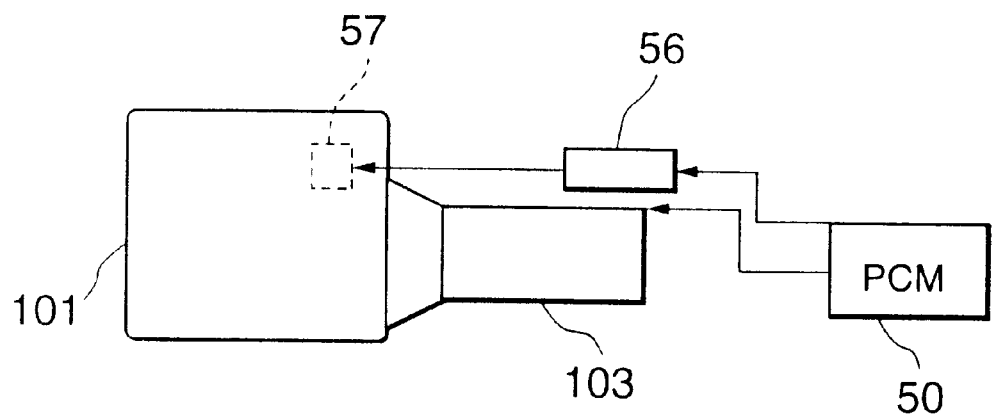
FIG. 11 is a schematic diagram of the essential parts of a drive force controller according to a third embodiment of this invention.

FIGS. 11–13, 16A–16D show a third embodiment of this invention relating to change-over of drive force characteristics. In this case, the PCM 50 controls drive force by changing the target air-fuel ratio of the engine 101 instead of changing the throttle gain or the speed change pattern. The engine 101 comprises a fuel injection valve 57 and a fuel injection control unit 56, which controls an injection amount and an injection timing of the valve 57, as shown in FIG. 11. In this engine 101, lean burn is performed according to the running conditions.

Figure 12:
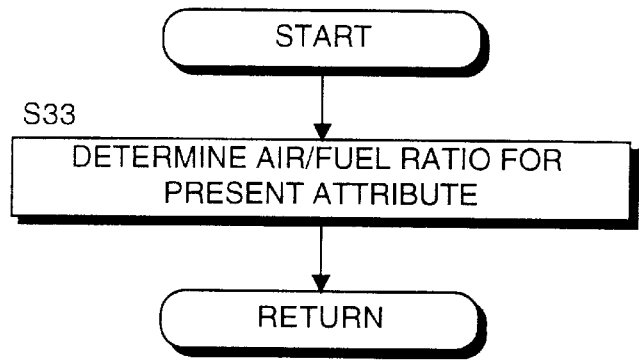
FIG. 12 is a flowchart describing a target air-fuel ratio setting process according to the third embodiment.

In a step of FIG. 12, the PCM 50 varies the target air-fuel ratio according to the regional attribute, and the modified target air-fuel ratio is transmitted to the fuel injection control unit 56. The fuel injection control unit 56 feedback controls the fuel injection amount of the fuel injection valve 57 so as to obtain the received target air-fuel ratio.

Figure 13:
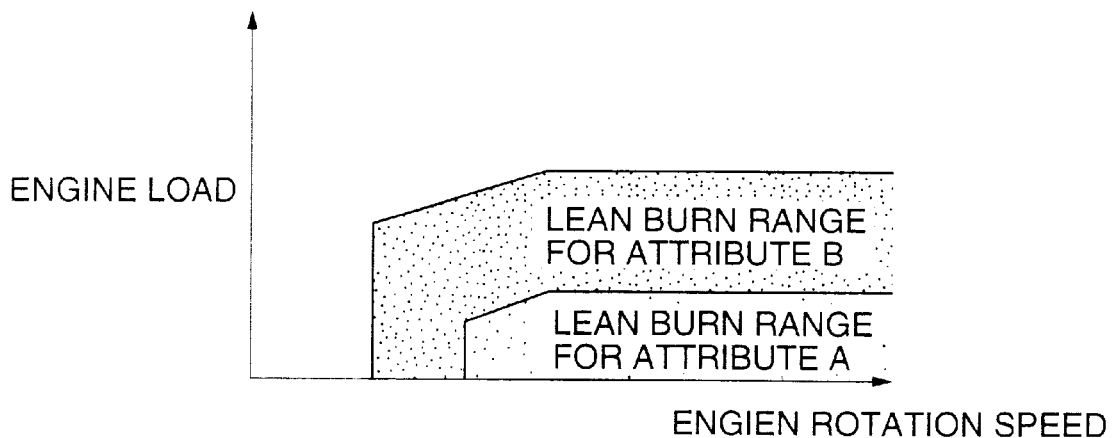
FIG. 13 is diagram describing a difference of lean burn region characteristics according to the third embodiment.

For example, as shown in FIG. 13, the target air-fuel ratio is changed so that the lean burn region is wider for regional attribute B designating a non-urban region than for regional attribute A designating an urban region. As a result, the fuel consumption rate becomes less when the vehicle is traveling in non-urban areas whereas high driving mobility Is obtained due to sufficient fuel supply in urban regions.

The result of control according to the third embodiment is shown by the timing charts of FIGS. 16A–16D. The solid line in the figures corresponds to this embodiment, and the broken line corresponds to the aforesaid prior art example.

According to the prior art, when the regional attribute was changed, the target air-fuel ratio changed regardless of accelerator operation. When the target air-fuel ratio was varied towards rich, the vehicle speed increased, and as the acceleration G of the vehicle varies largely contrary to the driver's intentions, the driver tended to experience discomfort.

On the other hand, according to the third embodiment of this invention, a change of target air-fuel ratio is not performed until the accelerator operation amount is 0. Due to this arrangement, the change-over of drive force is performed according to the driver's intention.

In the aforesaid embodiments, the determination of regional attribute in the step S1 of the main routine is performed by the position processing module 54. Change-over of regional attribute of the step 82, change-over of drive force characteristics of the step S3, and the drive force control performed in the background, are performed by the PCM 50. These processes may however be performed by one control unit.

Figure 17:
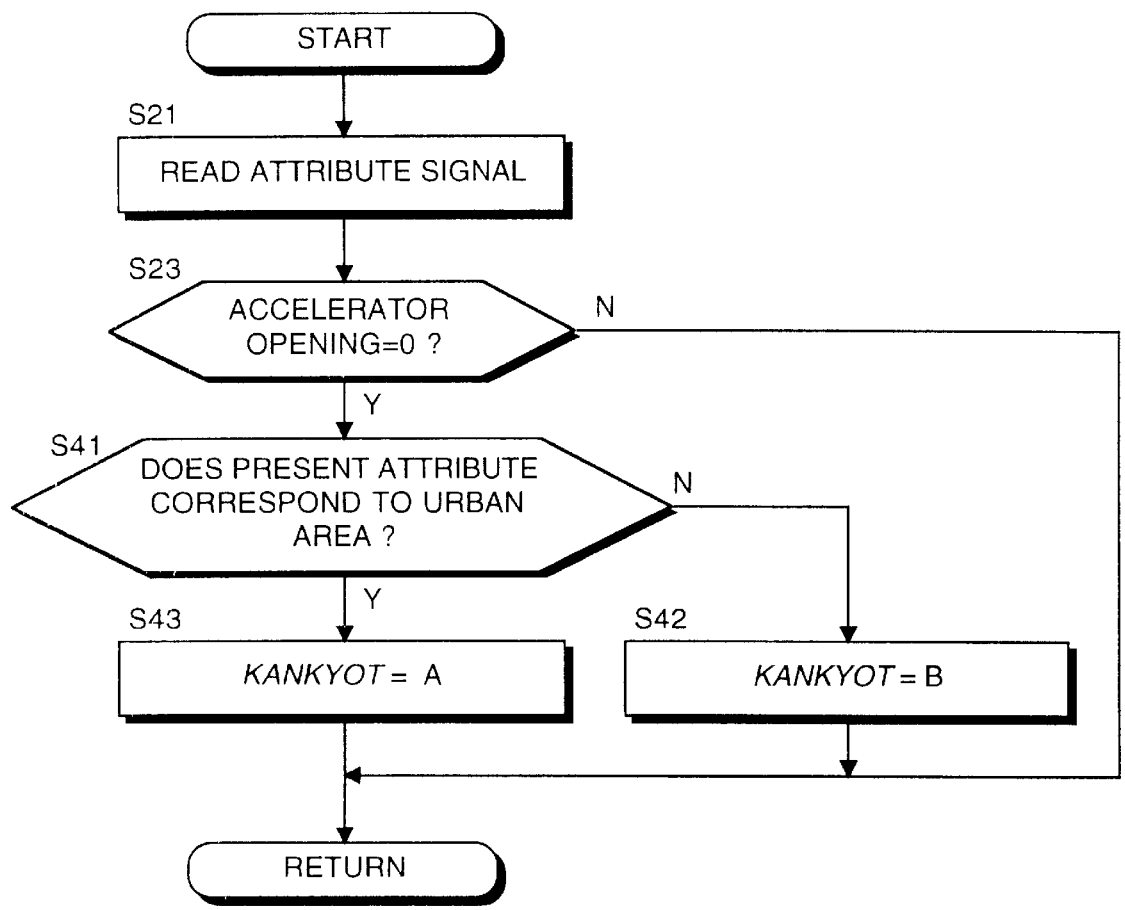
FIG. 17 is a flowchart describing a regional attribute change-over process according to a fourth embodiment of this invention.
Figure 18:
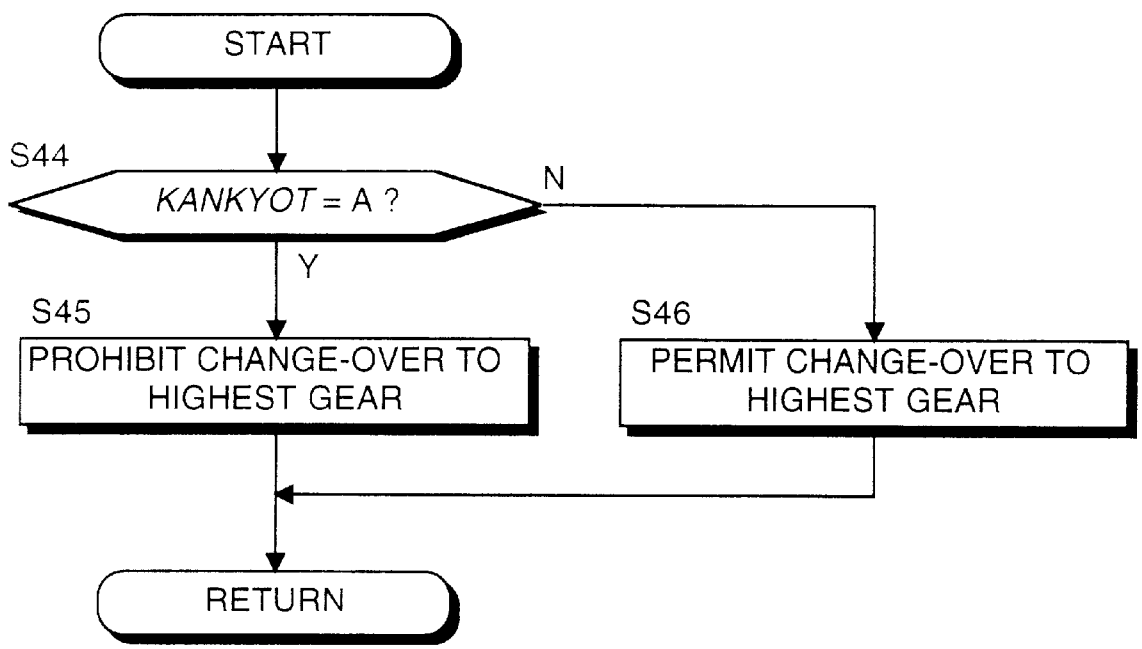
FIG. 18 is a flowchart explaining a speed change characteristic change-over process according to the fourth embodiment.

FIGS. 17 and 18 show a fourth embodiment of this invention.

According to this embodiment, as in the case of the first embodiment, the processes of FIG. 2 and FIG. 3 are executed, but a process shown in FIG. 17 is applied to a subroutine for changing over the regional attribute performed in the step S2 of the first embodiment. Drive force is also controlled via the automatic transmission 103 as in the case of the second embodiment. A process shown in FIG.

18 is applied to change-over of drive force characteristics performed by the PCM 50 in the background.

Steps S21 and S23 of FIG. 17 are the same as in the flowchart of FIG. 5 of the first embodiment. In a step S41 following the step S23, it is determined whether or not a regional attribute signal indicates an urban area. For urban areas, the attribute A is stored in the memory KANKYOT in a step S43, and in other cases, the attribute B is stored in the memory KANKYOT in the step S42.

First, in a step S44 of the process of FIG. 18, it is determined whether or not the attribute A is stored in the memory KANKYOT. When the attribute A is stored in KANKYOT, a change-over to the highest gear of the automatic transmission 103 is prohibited in a step S45. When the attribute A is not stored in KANKYOT, a change-over to the highest gear of the automatic transmission is permitted in the step S46.

Due to the above process, the highest stage gear is not used when the vehicle is traveling in an urban area, and good driving response is therefore obtained.

As in the case of the aforesaid second embodiment, the speed change pattern may be changed instead of prohibiting change-over to the highest gear.

Figure 19:
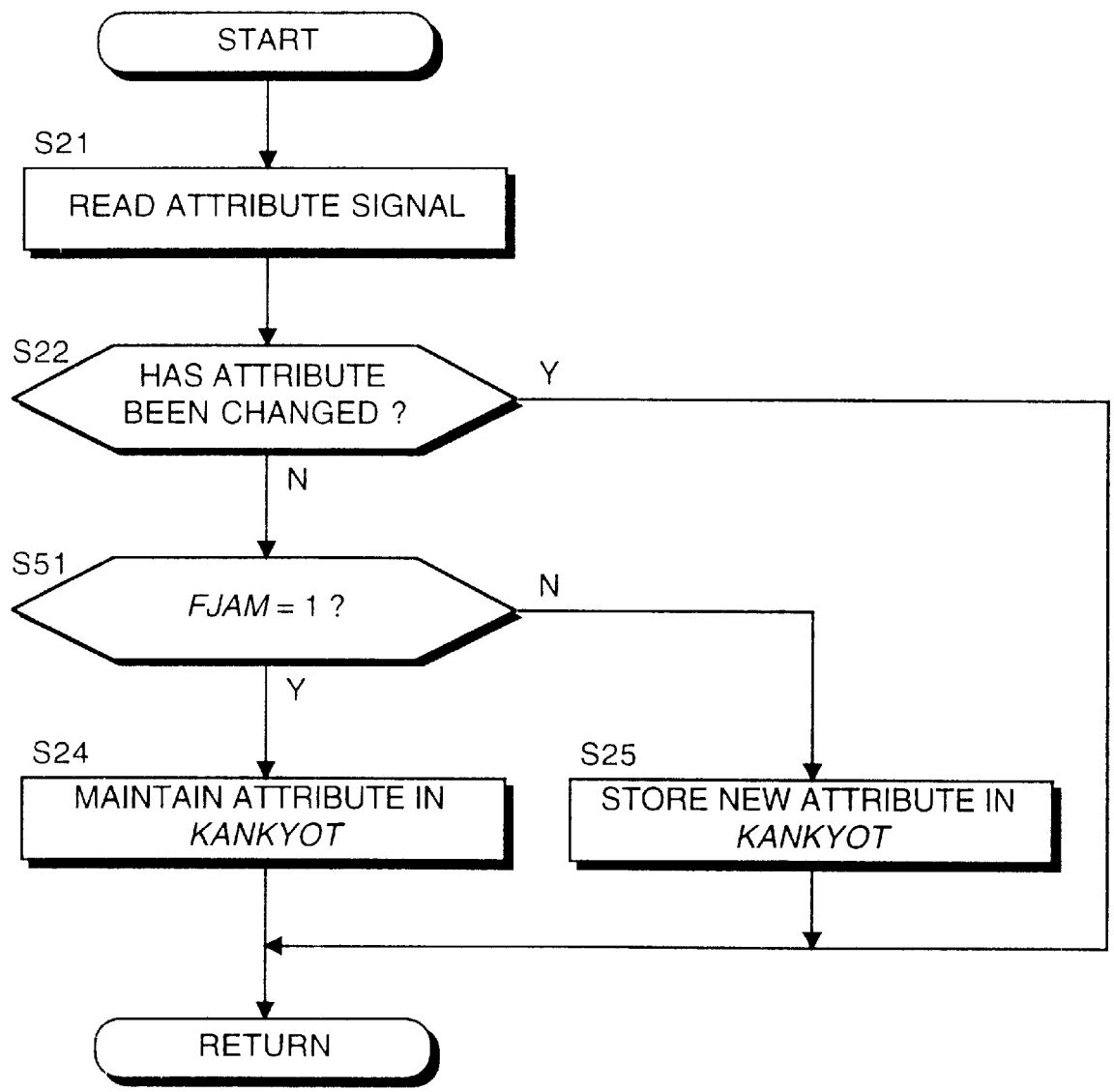
FIG. 19 is a flowchart describing a regional attribute change-over process according to a fifth embodiment of this invention.

FIGS. 19–24 show a fifth embodiment of this invention. According to this embodiment, a process shown in FIG. 19 is applied to a subroutine for changing over the regional attribute performed in the step S2 of FIG. 2.

The steps S21, S22, S24 and S25 of FIG. 19 are the same as those of FIG. 5.

In a step S51 following the step S22, it is determined whether or not the vehicle is traveling through a traffic jam. This determination is made by determining whether or not a traffic jam flag FJAM, described hereafter, is "1". When the vehicle is traveling in a traffic jam, the regional attribute stored in the memory KANKYOT on the immediately preceding occasion when the process was executed, is held in the step S24, and the process is terminated. When the vehicle is not traveling through a traffic jam, the regional attribute stored in the memory KANKYOT is updated by a regional attribute input in the step S21.

Figure 20:
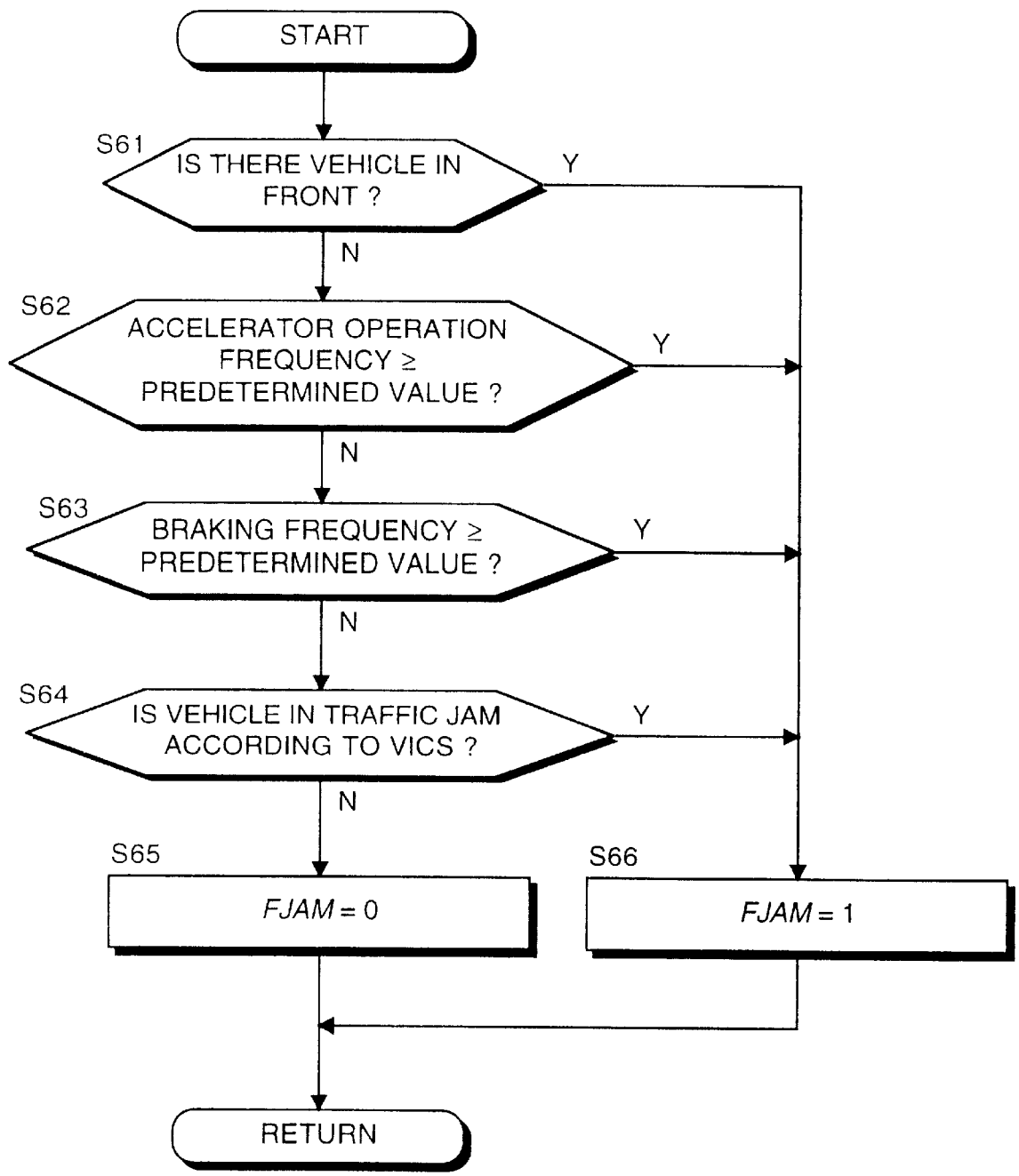
FIG. 20 is a flowchart explaining a traffic jam determining process according to the fifth embodiment of this invention.

The determination of whether or not the vehicle is traveling through a traffic jam is performed by the PCM 50 in a subroutine shown in FIG. 20. The camera 111 and image processing unit 53 shown in FIG. 1 are required in order to obtain information required for this subroutine.

In this subroutine, in a step S61, it is determined whether or not there are other vehicles in front of the vehicle. This is done based on images obtained by the camera 111 and data processed by the image processing device 53.

Figure 21A:
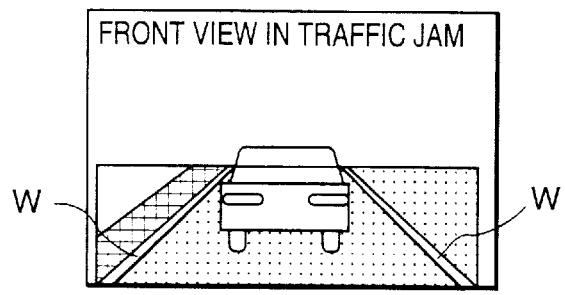
FIGS. 21A–21D are diagrams describing a vehicle-in-front determining logic according to the fifth embodiment.
Figure 21B:
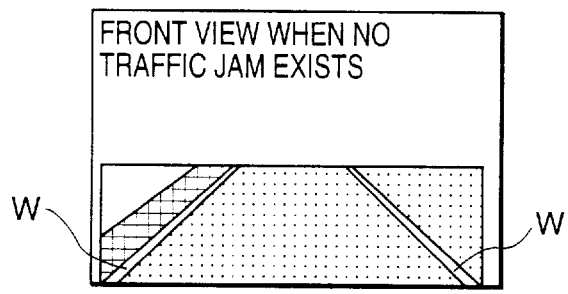

FIGS. 21A and 21B show examples of images obtained by the camera 111. In these figures, W shows white lines partitioning the road surface on which the vehicle is traveling.

Figure 21C:
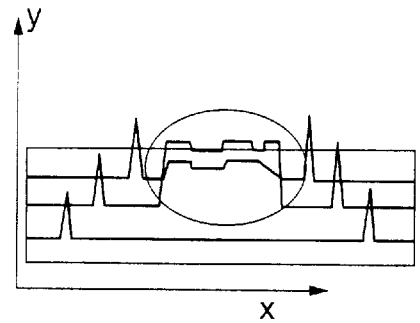
Figure 21D:
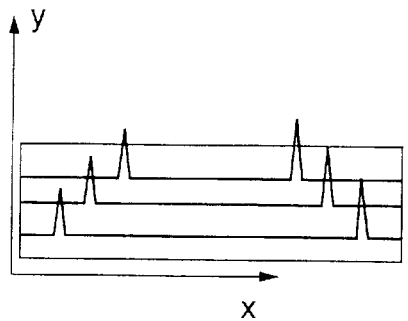

In FIG. 21A there is a vehicle in front 21A forward, and in FIG. 21B there is no vehicle in front. FIG. 21C is a brightness image obtained by analyzing the brightness of the image of FIG. 21A, and FIG. 21D is a similar brightness image obtained by analyzing the brightness of the image of FIG. 21B. In both figures, the brightness of parts corresponding to the white lines W is high, but when there is a vehicle in front, a change of brightness occurs in a part surrounded by an ellipse between the two white lines in *FIG. 21C.

When there is no vehicle in front, the brightness of this part is constant as shown in FIG. 21D.

Therefore if a brightness change occurs in the part corresponding to the ellipse in FIG. 21C, the image processing device 53 determines that there is a vehicle in front.

The aforesaid determination range varies according to vehicle speed. Specifically, the determining range shifts toward the lower part of the image as the vehicle speed becomes lower.

The detection range for vehicles in front therefore moves closer to the detecting vehicle the lower the vehicle speed.

Hence, when it is determined in the step S61 that there is a vehicle in front, the routine proceeds to a step S66, the flag FJAM showing that the vehicle is in a traffic jam is set to "1", and the process is terminated.

Figure 22:
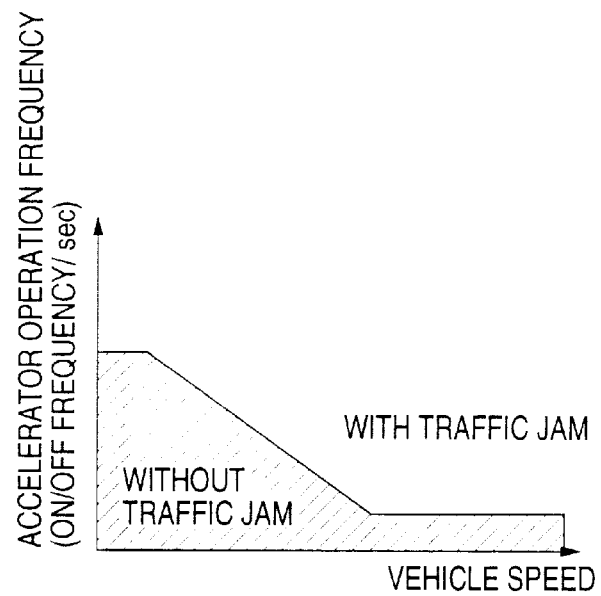
FIG. 22 is a diagram showing a relation between an accelerator pedal operating frequency and a traffic jam.

When it is determined in the step S61 that there is no vehicle in front, it is determined in a step S62 whether or not the operation frequency of the accelerator pedal is higher than a predetermined value. This operation frequency is a value obtained by measuring the number of operations per unit time between when the accelerator pedal is ON (depressed position) and OFF (idling position). As shown in FIG. 22, the operation frequency of the accelerator pedal increases during a traffic jam. Therefore, it is determined whether or not the vehicle is in a traffic jam using the accelerator operation frequency as a parameter.

When the operation frequency of the accelerator pedal is equal to or higher than the predetermined value in the step S62, the routine proceeds to the step S66, the flag FJAM showing that the vehicle Is in a traffic jam is set to "1", and the process is terminated. When the operation frequency of the accelerator pedal is less than the predetermined value, the routine proceeds to the step S63.

Figure 23:
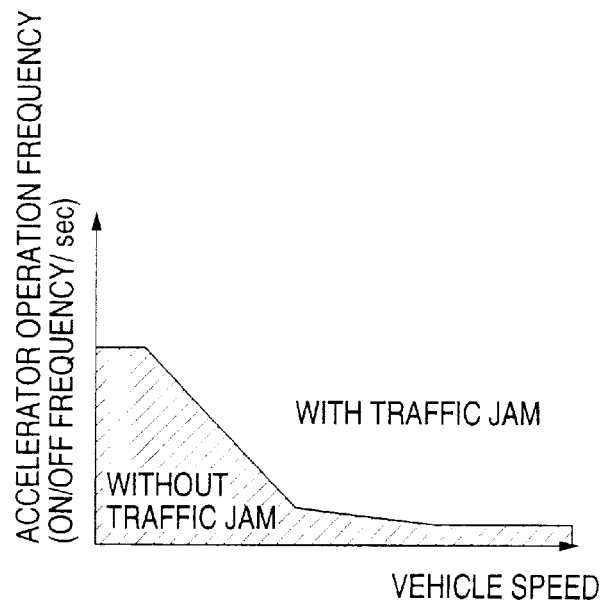
FIG. 23 is a diagram showing a relation between a brake pedal operating frequency and a traffic jam.

In the step S63, it is determined whether or not a brake operation frequency is equal to or greater than a predetermined value. The brake operation frequency is based on a brake operation signal from a brake operation switch 106, and is obtained by measuring the number of ON/OFF brake operations in unit time. As shown in FIG. 23, this value also becomes larger during a traffic jam. Therefore, it is determined whether or not the vehicle is in a traffic jam using the brake operation frequency as a parameter.

When the brake operation frequency is equal to or greater than a predetermined value in the step S63, the routine proceeds to the step S66, the flag FJAM showing that the vehicle is in a traffic jam is set to "1", and the process is terminated. When the brake operation frequency is less than the predetermined value in the step S63, the routine proceeds to a step S64.

In the step S64, it is determined whether or not the vehicle is in a traffic jam based on information from a Vehicle Information Communication System (VICS). VICS is a system wherein traffic information, e.g. where traffic jams are located, are transmitted by a base station to traveling vehicles. The PCM 50 receives this information via a receiving unit comprising the GPS antenna 113 and position information processing module 54.

The PCM 50 determines whether or not the vehicle is in a traffic jam by comparing the location of traffic jams obtained by VICS with the current position of the vehicle detected by the position information processing module 54.

When it is determined that the vehicle is passing through a traffic jam, the routine proceeds to the step S66, the flag FJAM showing that the vehicle is in a traffic jam is set to "1", and the process is terminated. When it is determined that the vehicle is not passing through a traffic jam, the routine proceeds to a step S65.

In the step S65, the flag FJAM showing that the vehicle is in a traffic jam is reset to "0", and the process is terminated.

It should be noted that any drive force control process such as control of throttle gain, speed change pattern and target air-fuel ratio which were described in the aforesaid first-third embodiments may be applied to this embodiment.

Hence, according to this embodiment, even when the regional attribute signal changes, the regional attribute is not changed and is held if it is determined that the vehicle is traveling through a traffic jam.

Therefore, drive force does not change abruptly due to a change of regional attribute when the vehicle is traveling through a traffic jam, and the driver does not experience a sense of discomfort. Also, when the vehicle leaves the traffic jam area, a suitable drive force is obtained according to the regional attribute for the area in which the vehicle is currently traveling.

Figure 25:
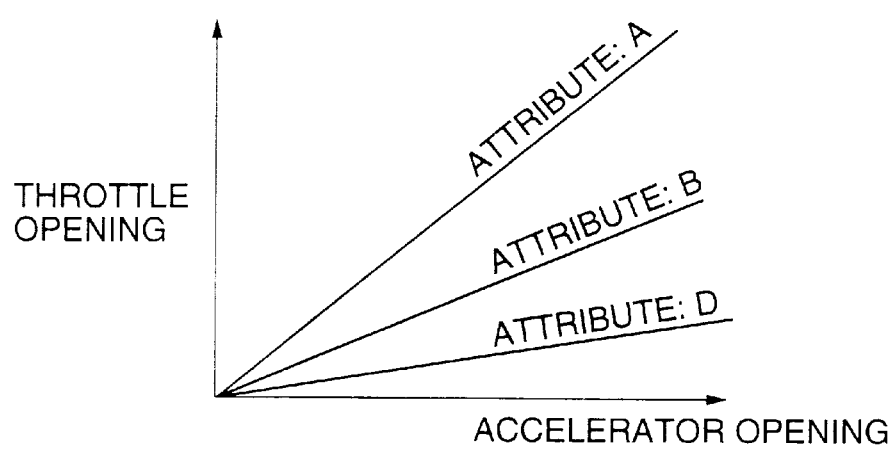
FIG. 25 is a graph showing throttle gain characteristics according to the sixth embodiment.
Figure 24:
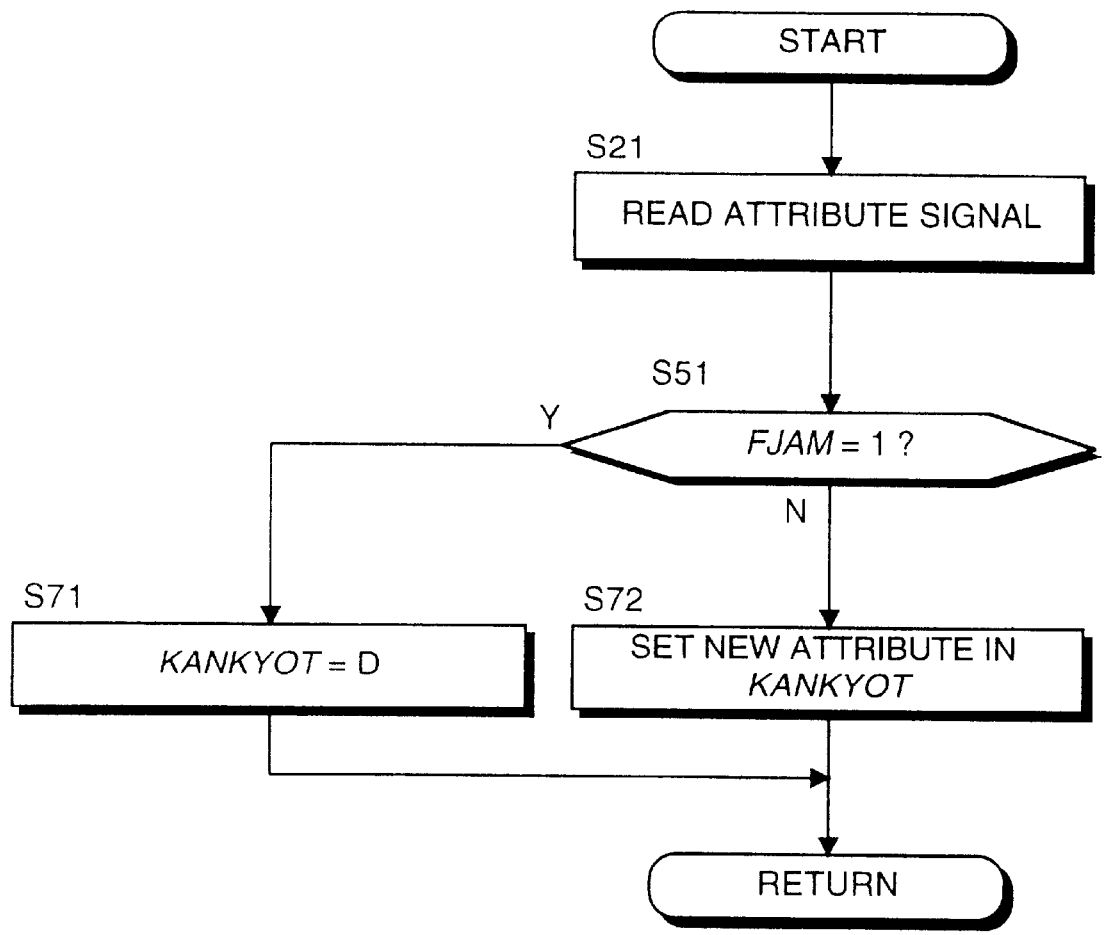
FIG. 24 is a flowchart explaining a regional attribute change-over process according to a sixth embodiment of this invention.

FIGS. 24 and 25 show a sixth embodiment of this invention.

According to this embodiment, a subroutine of FIG. 24 is applied instead of the subroutine for changing over the regional attribute of FIG. 19. An attribute D is assigned to the regional attribute showing that the vehicle is traveling through a traffic jam.

By arranging the drive force to be smaller than other attributes, driving slowly through the traffic jam is rendered easier, and fuel consumption is reduced.

First, in a step S21, a regional attribute signal input from the external environment information processing module 52 is read as in the case of the first embodiment. At this point, the attribute D is not contained in the regional attribute signal which is input.

Next, in a step S51, it is determined whether or not the traffic jam flag FJAM is "1", i.e. whether or not the vehicle is traveling through a traffic jam, as in the case of the fifth embodiment.

When FJAM=1, in a step S71, the attribute D is stored in the memory KANKYOT and the process is terminated.

When FJAM is not "1", the read regional attribute read is stored in the memory KANKYOT in a step S72, and the process is terminated.

According also to this embodiment, control of throttle gain, speed change pattern or target air-fuel ratio described in the aforesaid first-third embodiments may be applied to the drive force control process based on the regional attribute stored in the memory KANKYOT, however in the case of this embodiment, a specific setting corresponding to the attribute D is provided whichever control is used.

For example, when the drive force is modified by throttle gain, as shown in FIG. 25, the throttle gain is set so as to make the throttle opening even smaller relative to the accelerator opening for the attribute D than for the aforesaid attribute B.

When the speed change pattern is modified, the pattern is modified so that the drive force is minimized for the attribute D compared to other attributes, i.e. so that a higher gear is used for the attribute D than for other attributes for the same vehicle speed and same accelerator opening.

When the air-fuel ratio is modified, the target air-fuel ratio is set so that leaner burn takes place in a lower rotation speed region and lower load region for the attribute D compared to other attributes.

Figure 26:
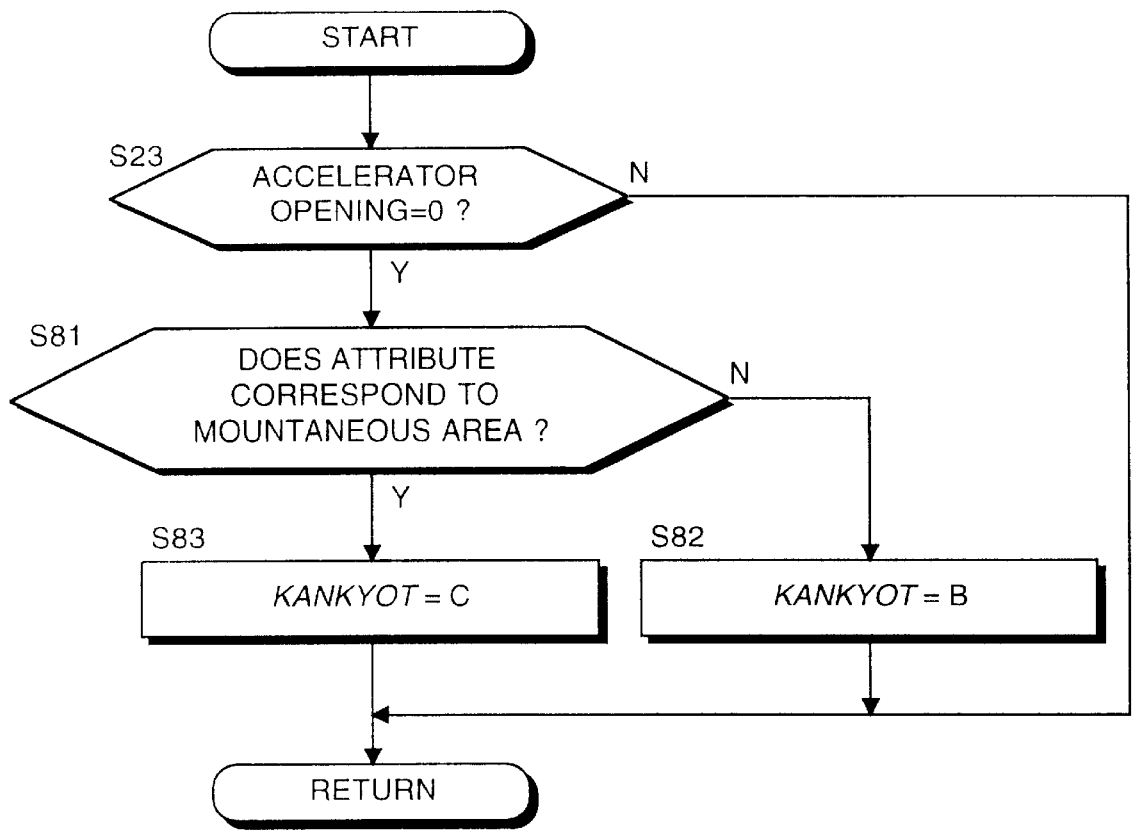
FIG. 26 is a flowchart describing a regional attribute change-over process according to a seventh embodiment of this invention.
Figure 27:
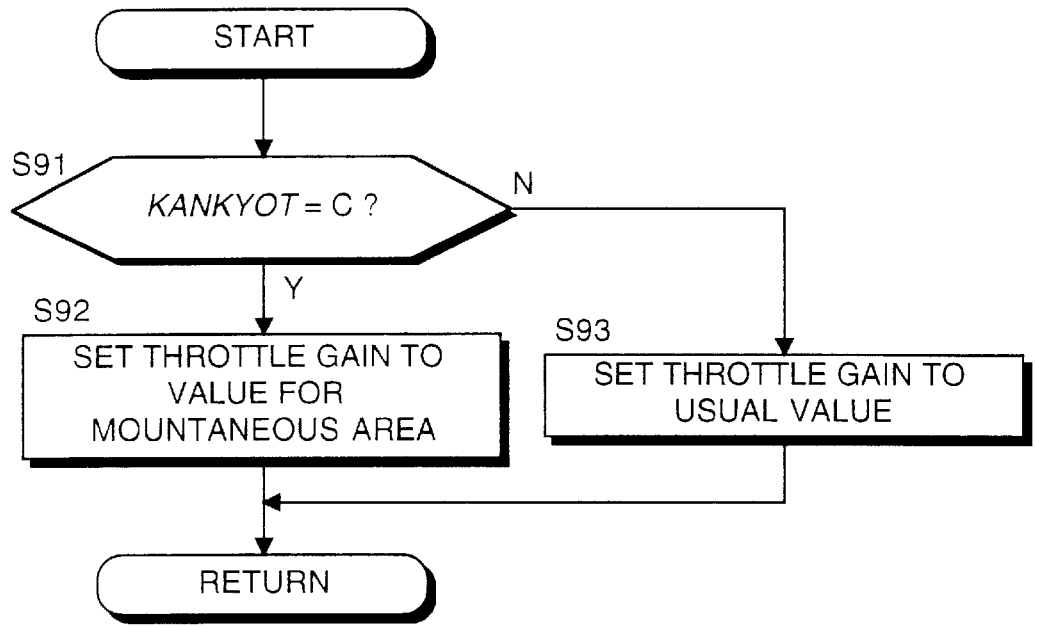
FIG. 27 is a flowchart describing a throttle gain setting process according to the seventh embodiment.
Figure 28:
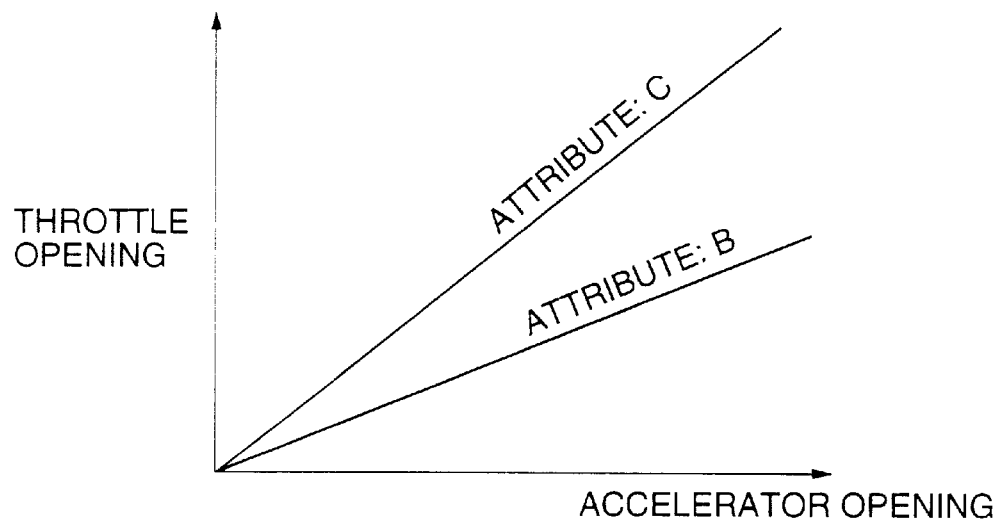
FIG. 28 is a graph showing throttle gain characteristics according to the seventh embodiment.

FIGS. 26–28 show a seventh embodiment of this invention.

According to this embodiment, it is determined whether or not the regional attribute corresponds to mountainous ground, and when the vehicle Is traveling on mountainous ground, the drive force is increased.

The hardware construction, main routine and regional attribute determining process are the same as those of the first embodiment.

FIG. 26 shows a regional attribute change-over process performed instead of the process of FIG. 5 of the first embodiment.

First, in the step S23, it is determined whether or not the accelerator operation amount is 0.

When the accelerator operation amount is 0, the routine proceeds to a following step S81, and when the accelerator operation amount is not 0, the process is terminated. This is in order to prevent the drive force from changing abruptly, thereby giving a sense of discomfort to the driver, when the accelerator operation amount is not 0.

In the step S81, it is determined whether or not the vehicle is traveling on mountainous ground. This determining process is the same as the process shown in FIG. 3 of the aforesaid first embodiment.

When it is determined that the vehicle is traveling on mountainous ground, the routine proceeds to a step S83, and when it is determined that the vehicle is traveling in a region other than mountainous ground, the routine proceeds to a step S82.

In the step S82, the regional attribute stored in the memory KANKYOT is set to, e.g. attribute B showing that the vehicle is traveling in a region other than mountainous ground, and the process is terminated.

In the step S83, the regional attribute stored in the memory KANKYOT is set to, e.g. attribute C indicating mountainous ground, and the process is terminated.

FIG. 27 shows the drive force change-over process performed by the PCM 50 in the background.

First, in a step S91, it is determined whether or not the regional attribute C is stored in the memory KANKYOT.

When the attribute C is stored, in a step 392, the throttle gain is set to a value for mountainous ground and the process is terminated. When another attribute, i.e. the attribute B is stored, the throttle gain is set to the usual value in a step S93, and the process is terminated.

The throttle gain set in this case is shown in FIG. 28. Compared to the usual throttle gain, the throttle gain for a mountainous region is set so that the throttle opening is larger for the same accelerator opening. In other words, the engine output responds sensitively to a small depression of the accelerator pedal. As a result, the vehicle is driven at high output on mountainous ground, and sufficient drive force is obtained on a hill.

Figure 29:
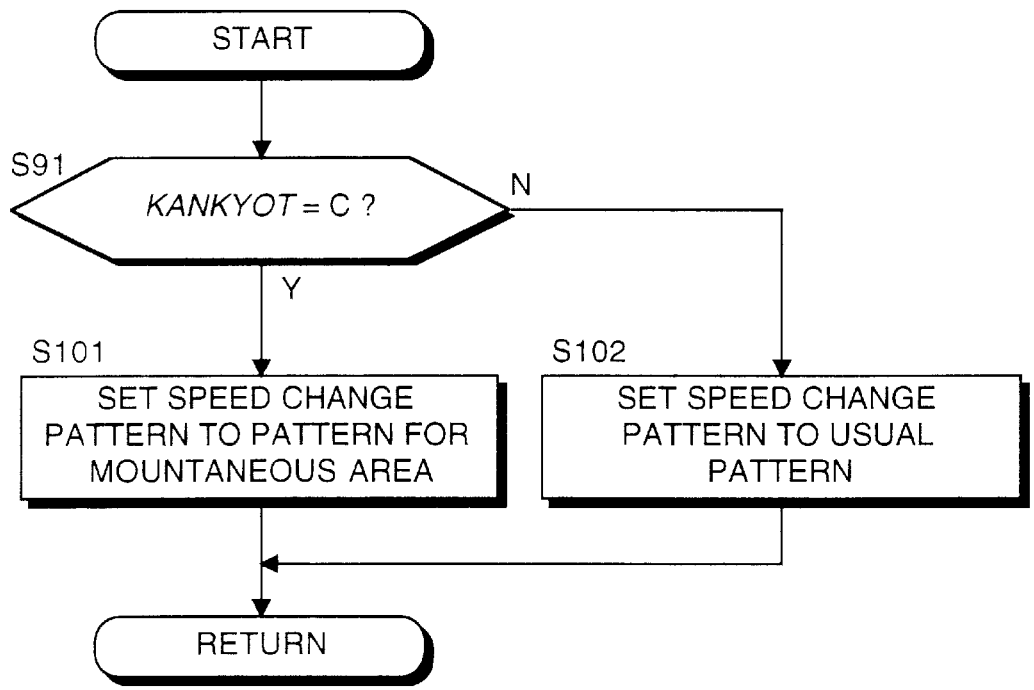
FIG. 29 is a flowchart describing a speed change pattern setting process according to an eighth embodiment of this invention.
Figure 30:
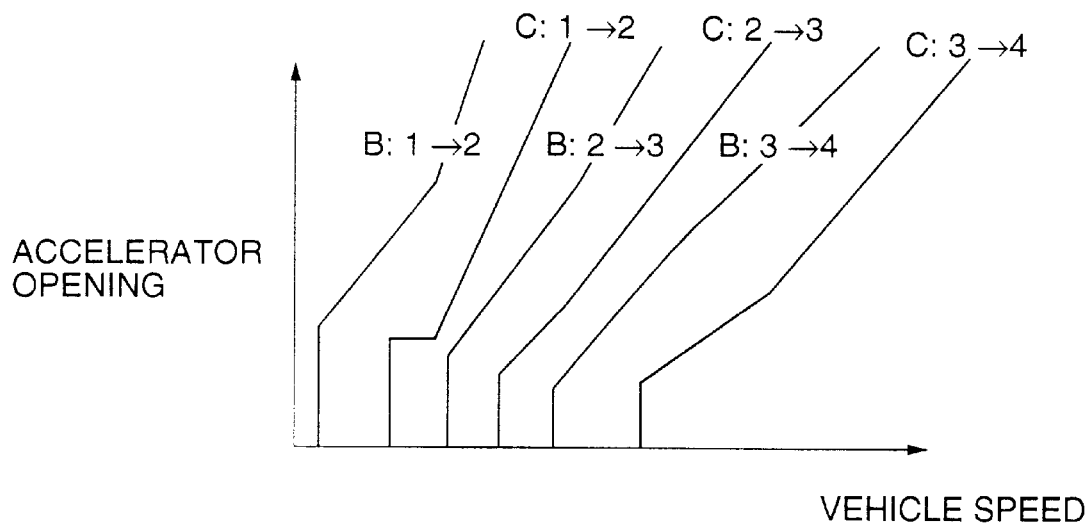
FIG. 30 is a diagram showing a speed change pattern according to the eighth embodiment.

FIGS. 29 and 30 show an eighth embodiment of this Invention.

This embodiment differs from the seventh embodiment in that modification of drive force is performed not by setting the throttle gain, but by setting the speed change pattern. The remaining features of the construction are the same as those of the seventh embodiment.

According to this embodiment, the flowchart of FIG. 29 is applied instead of the flowchart of FIG. 27.

First, it is determined whether or not the attribute stored in the memory KANKYOT in the step S91 is the attribute C.

When the attribute C is stored, the speed change pattern is set to a pattern for mountainous ground in a step S101, and the process is terminated. When another attribute, i.e., the attribute B is stored, the speed change is set to the usual pattern in a step S102, and the process is terminated.

As shown in FIG. 30, compared to the usual pattern, the speed change pattern for mountainous ground is set so that a lower gear is used for the same vehicle speed and same accelerator opening. As a result, in mountainous terrain, more drive force is obtained for each gear, and suitable drive force characteristics are obtained when traveling up a hill.

Figure 31:
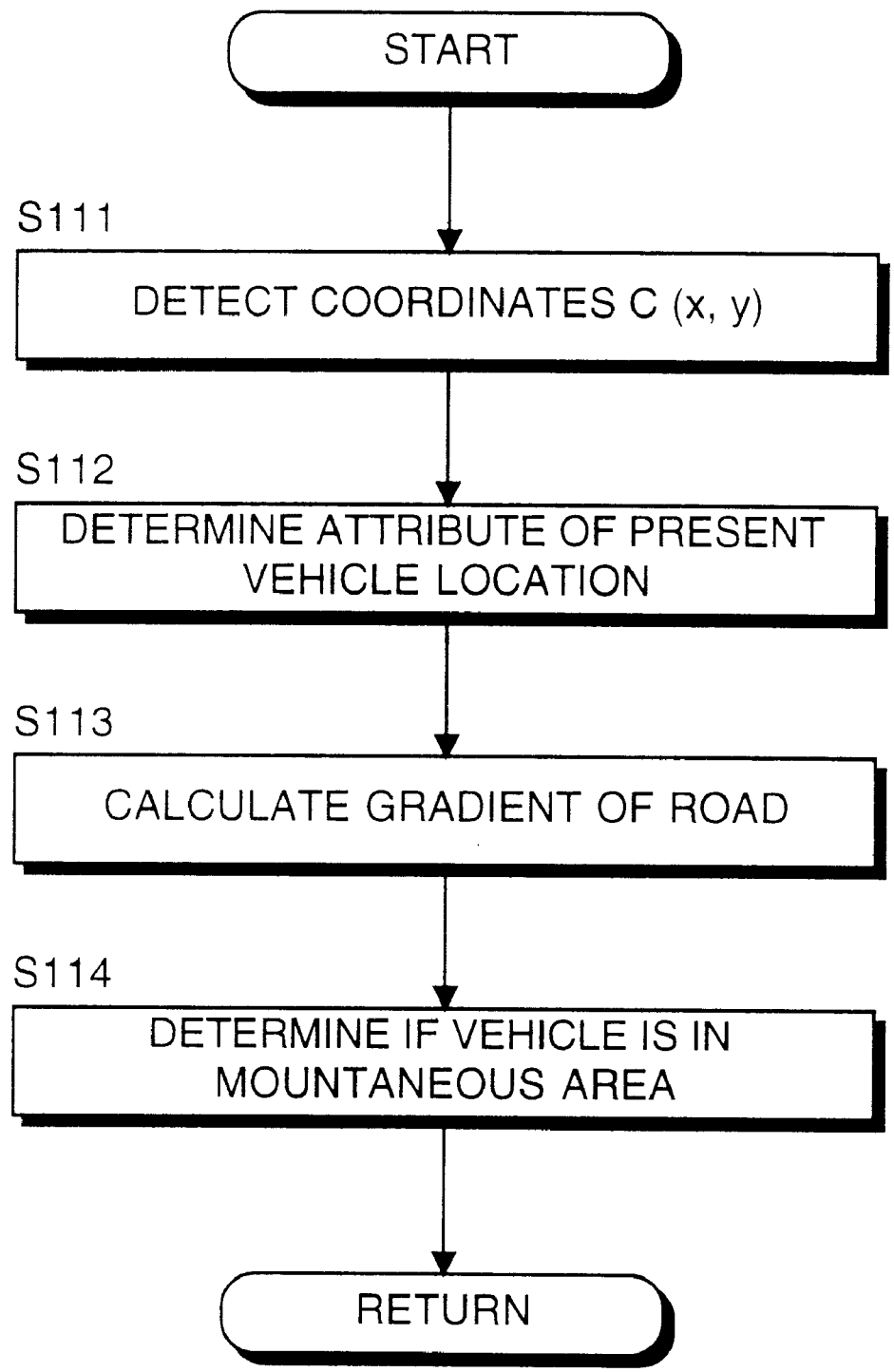
FIG. 31 is a flowchart describing a regional attribute determining process according to a ninth embodiment of this invention.
Figure 32A:
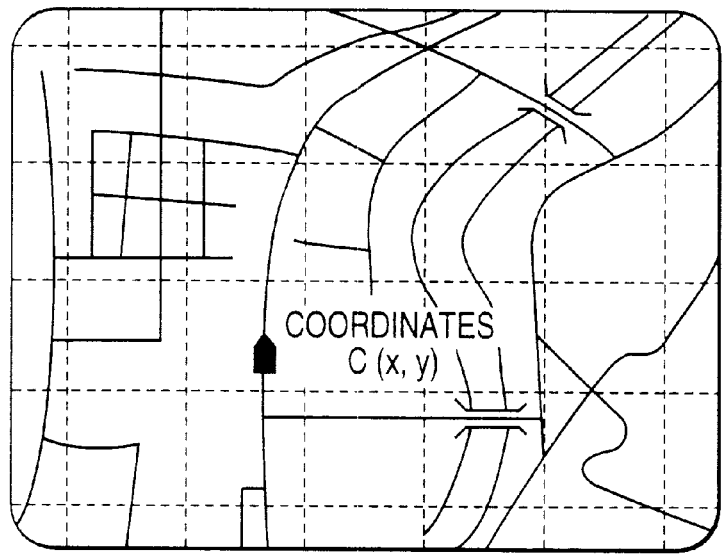
FIGS. 32A and 32B are schematic representations of a monitor display of a navigation device describing a road gradient calculating method according to the ninth embodiment.
Figure 32B:
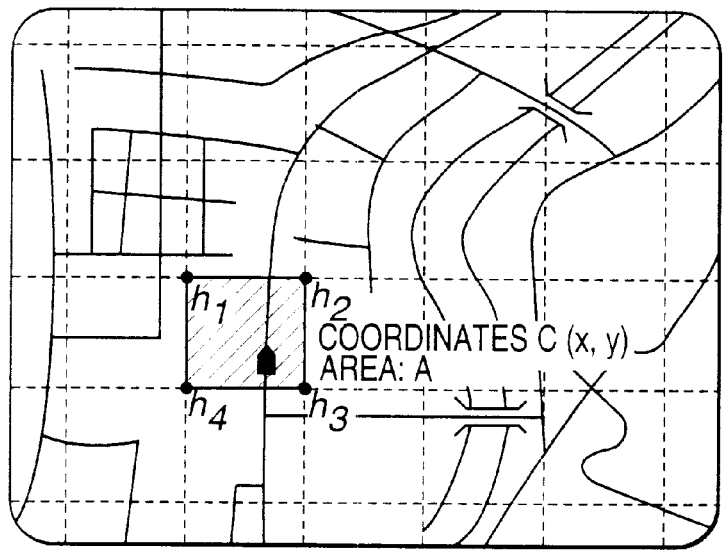
Figure 33:
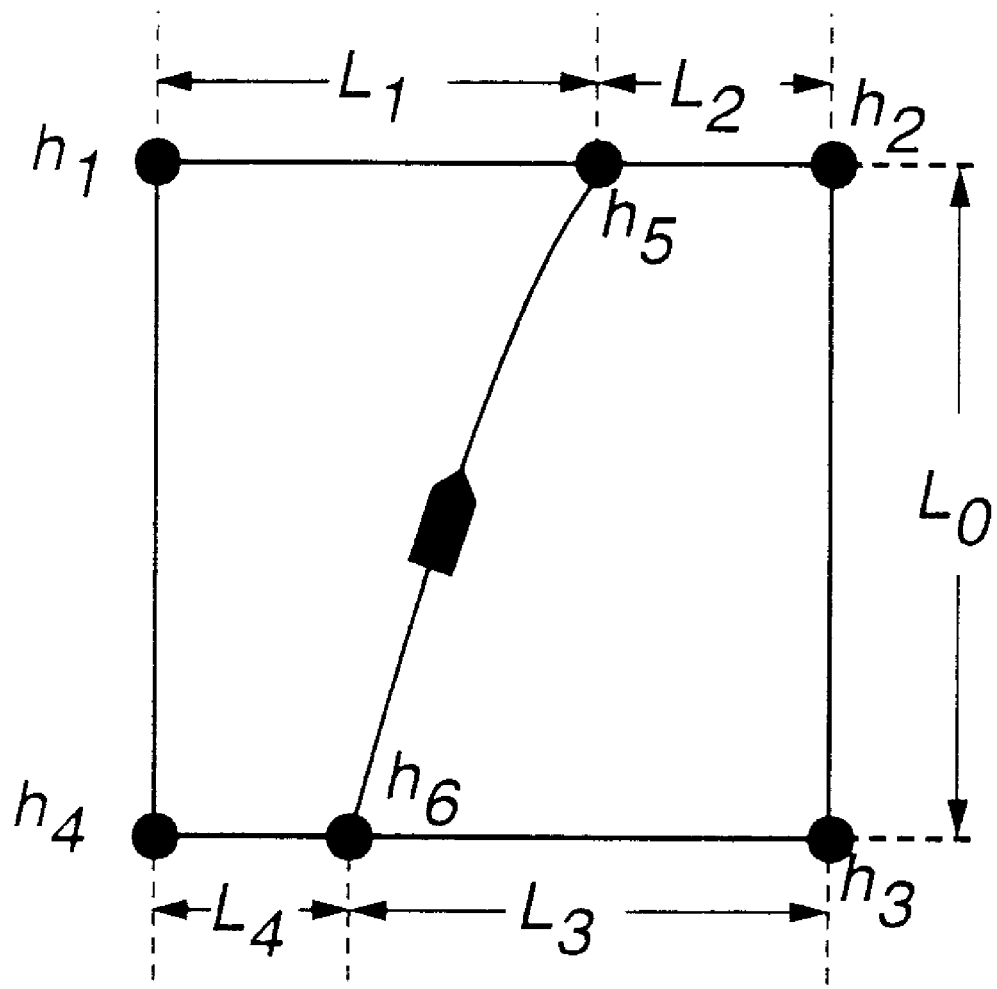
FIG. 33 is a diagram illustrating the calculation details of a road gradient according to the ninth embodiment.

FIGS. 31–33 show a ninth embodiment of this invention.

According to this embodiment, the current terrain is compared with a previously stored regional attribute, and instead of determining a regional attribute where the vehicle is currently traveling, a road slope is detected, and the determination is performed based on the road slope. The flowchart of FIG. 31 is therefore applied instead of the regional attribute determining process of FIG. 3.

First, in a step S111, position coordinates C(x,y) on the vehicle on a map are detected from the position information processing module 54 and a signal from the GPS antenna 113.

In a step S112, the area on the map in which the vehicle is located is determined from map data stored by the position information processing module 54. When the vehicle is located at the coordinates C(x,y) shown in FIG. 32A, for example, it is determined that the position of the vehicle is located in a region A shown in FIG. 32B.

In a step S113, the slope of the road on which the vehicle is traveling is calculated using previously stored altitude information for the points h1–h4 at the four corners of the region A.

For example when the vehicle is traveling at a position shown in FIG. 33, if the point at which the travel direction of the vehicle intersects with a straight line linking the points h1, h2 is h5, and the point at which the vehicle path intersects with a straight line lining the points h3, h4 is h6, the slope of the road is expressed by the following equation (1).

$$k = \frac{h_5 - h_6}{L_0} \quad (1)$$

$$\text{where, } h_5 = \frac{L_i \cdot h_2 + L_2 \cdot h_1}{L_1 + L_2}$$

$$h_6 = \frac{L_3 \cdot h_4 + L_4 \cdot h_3}{L_3 + L_4}$$

$L_0$=length of side of area A
$L_1$=length of line joining h1, h5
$L_2$=length of line joining h5, h2
$L_3$=length of line joining h3, h6
$L_4$=length of line joining h6, h4

In a step S114, the slope of the road calculated in this way is compared with a predetermined value, and when it is larger than the predetermined value, it is determined that the regional attribute is attribute C denoting mountainous terrain. The determination result is transmitted to the external environment processing module 52 from the position information processing module 54. The predetermined value is set to a smaller value than the average slope of the mountainous ground.

Figure 34:
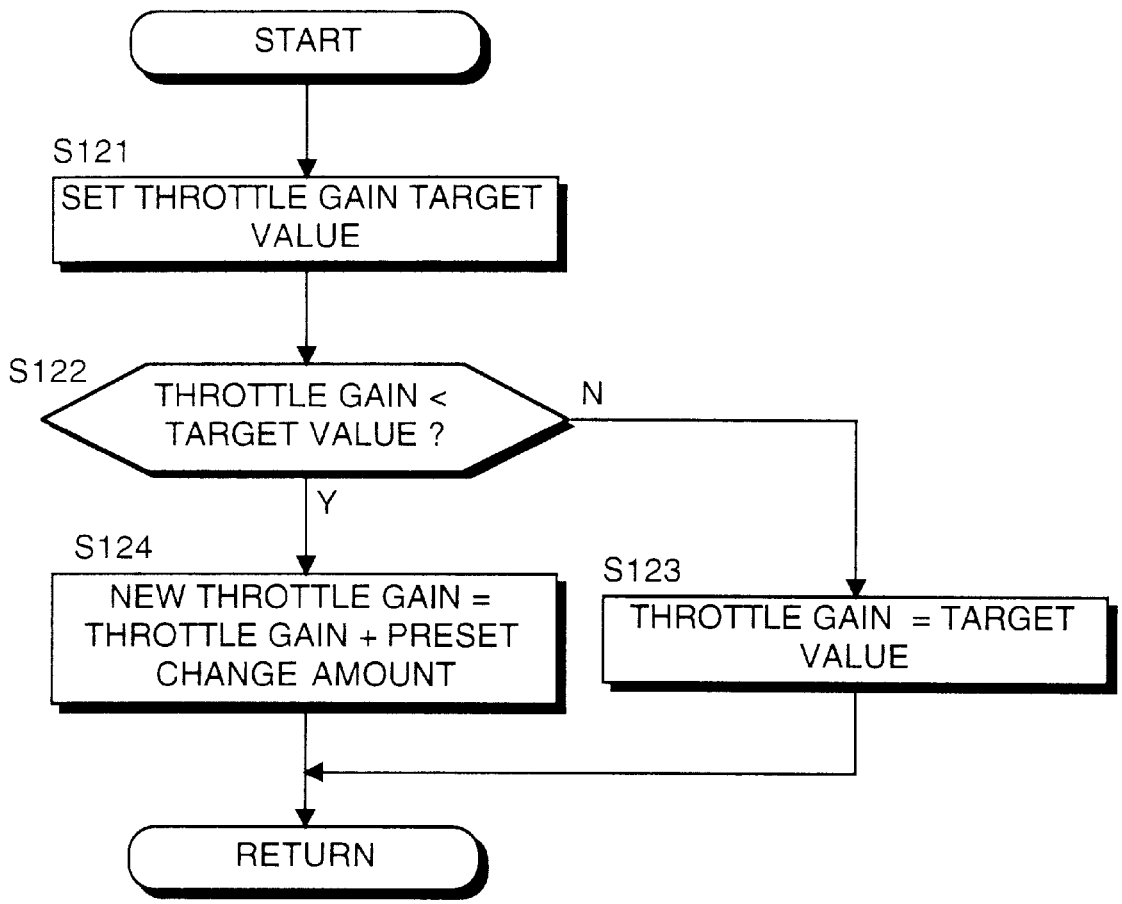
FIG. 34 is a flowchart explaining a throttle gain setting process according to a tenth embodiment of this invention.

FIG. 34 shows a tenth embodiment of this invention.

According to this embodiment, the throttle gain is changed over according to the regional attribute as in the case of the aforesaid first embodiment, but the change-over is performed gradually so that an abrupt change of drive force is prevented.

Figure 35:
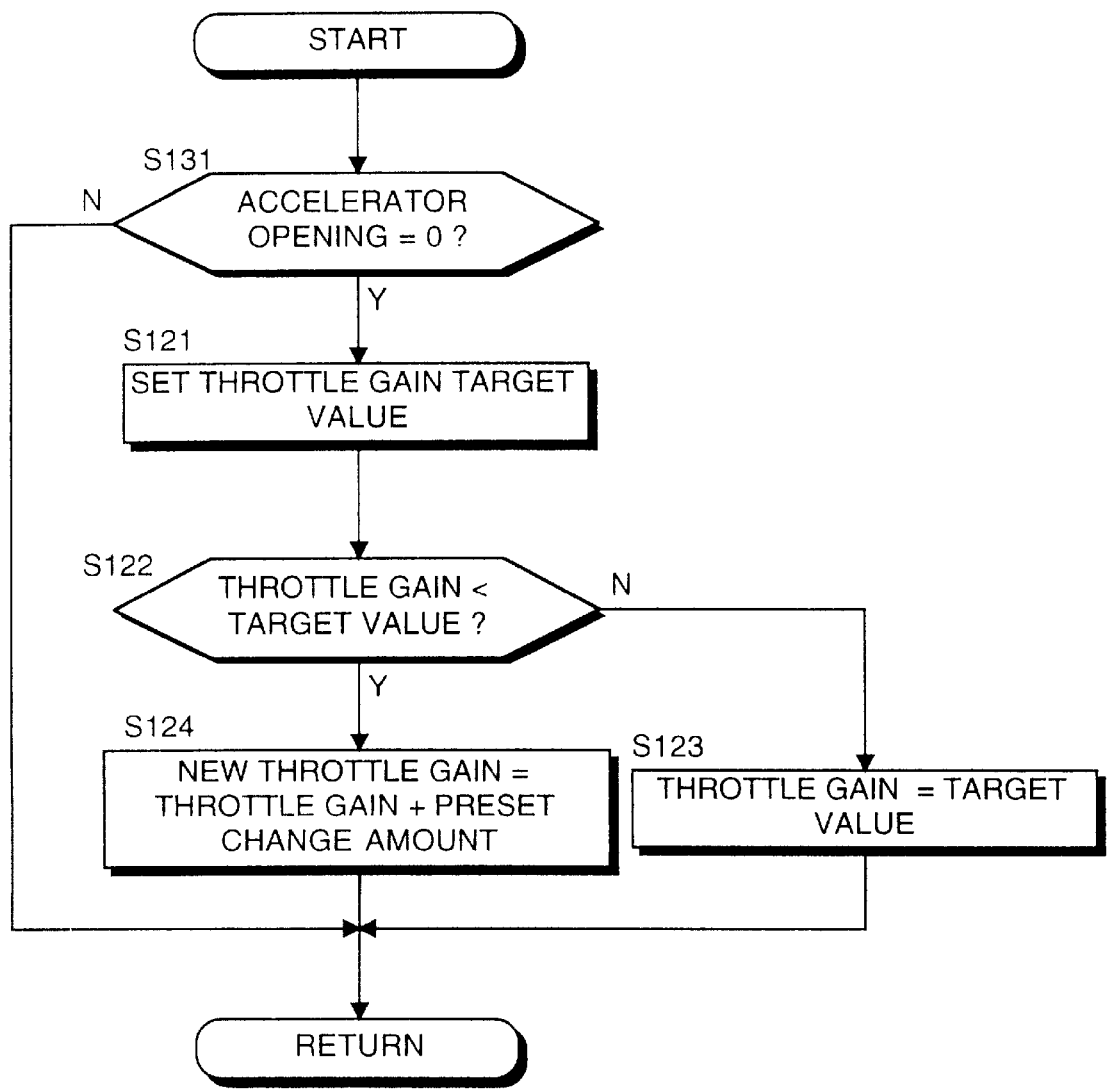
FIG. 35 is a flowchart explaining a throttle gain setting process according to an eleventh embodiment of this invention.

This process is performed by applying a subroutine shown in FIG. 35 in a step S31 of FIG. 6.

First, in a step S121, a throttle gain target value is determined based on the regional attribute determined by the position information processing module 54.

This corresponds to the magnification TVOG of the throttle opening set in the aforesaid first embodiment.

Next, in a step S122, it is determined whether or not the present throttle opening is less than the throttle gain target value. When the present opening is equal to or larger than the target value, in a step S123, the throttle gain is set equal to the throttle gain target value and the process is terminated.

On the other hand when the present throttle opening is less than the target value, in a step S124, a value obtained by adding a change amount to the magnification of present throttle opening is set as a new throttle gain, and the process is terminated.

Therefore, even when the target value of throttle gain increases due to a change of regional attribute, the throttle gain does not change abruptly, but approaches the target value by predetermined variational increments. As a result, the drive force and vehicle speed do not change abruptly while the vehicle is traveling, and drive force characteristics vary smoothly without imparting a sense of discomfort to the driver.

In a step S122, when it is determined that the throttle gain is equal to or greater than the target value, the throttle gain is immediately set equal to the target value. When the throttle gain is low, the vehicle speed does not immediately decrease due to the inertia of the vehicle and the driver is not likely to experience any discomfort. Nevertheless, it will be understood that even when the throttle gain is greater than the target value, the throttle gain may still be made to approach the target value gradually.

FIG. 35 shows an eleventh embodiment of this invention. The difference of this embodiment from the tenth embodiment is only a step S131 of FIG. 35. In the step S131, it is determined whether or not the accelerator operation amount is 0, and when it is not 0, the process is terminated without setting the throttle gain.

The step S121 and subsequent steps are performed only when the accelerator operation amount is 0.

Therefore, the routine is so designed that, unless the accelerator operation amount is 0, the throttle gain and the drive force characteristics do not change. Hence, an abrupt change-over of drive force contrary to the driver's intentions during accelerator operation is prevented, as in the aforesaid first embodiment. Also, the driver who is aware of a change of regional attribute from the display of the monitor 112, can update the drive force characteristics of the vehicle suited to a new regional attribute by restoring the accelerator operation amount to 0.

In other words, the change-over of drive force characteristics is performed with a timing in conformity with the driver's intentions.

Figure 36:
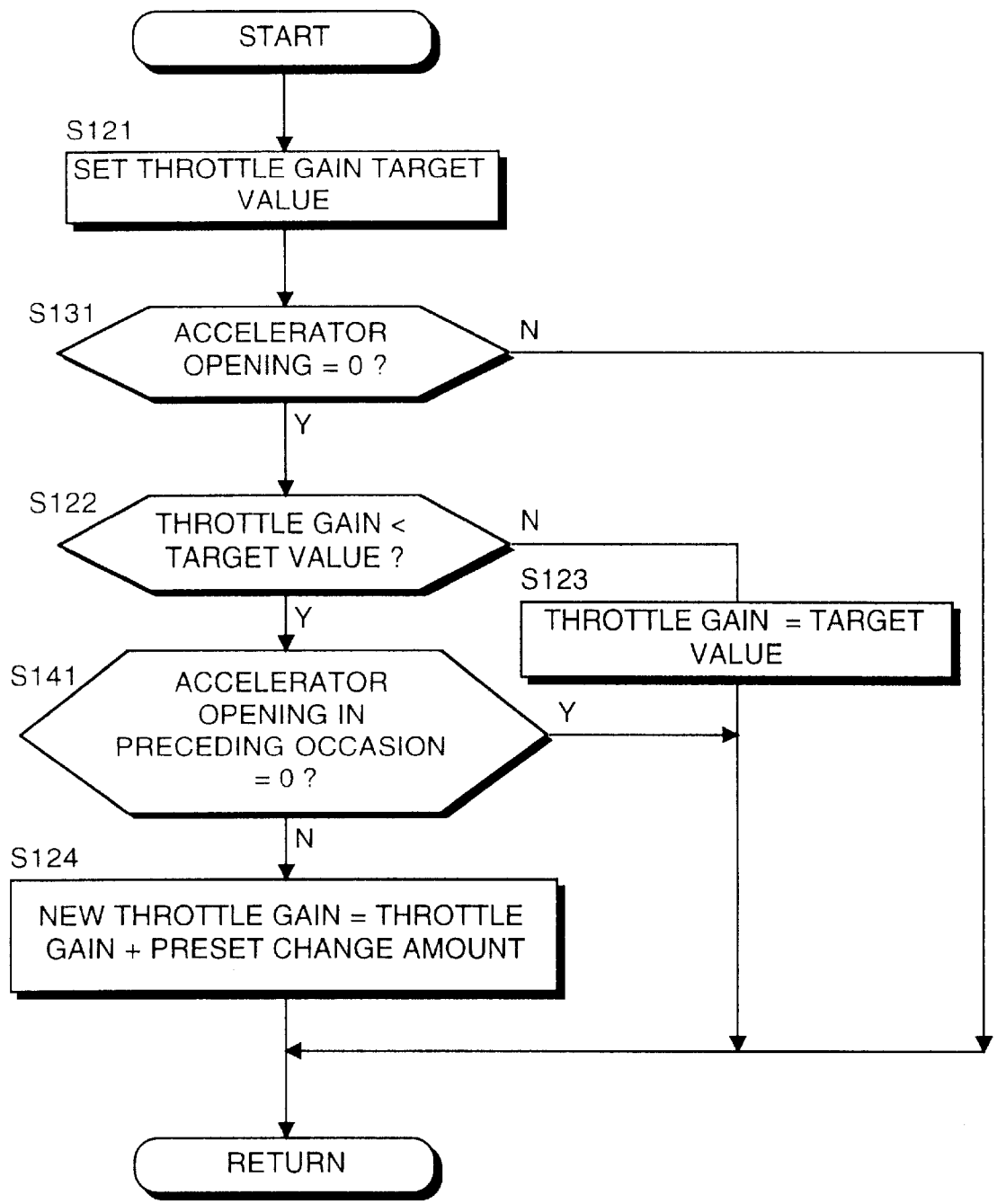
FIG. 36 is a flowchart explaining a throttle gain setting process according to a twelfth embodiment of this invention.

FIG. 36 shows a twelfth embodiment of this invention.

According to this embodiment, a step S141 is added to the throttle gain setting process of FIG. 35.

The step S141 is performed following the step S122. In this step S141, it is determined whether or not the accelerator operation amount was 0 on the immediately preceding occasion when the routine was performed.

When the accelerator operation amount was 0 on the immediately preceding occasion when the routine was performed, in the step S124, a new throttle gain is set by adding a predetermined variation amount to the throttle gain, and the process is terminated.

According to this process, even when the target value of the throttle gain varies and the accelerator operation amount is 0, the variation of throttle gain is limited to only one occasion and it varies only by a predetermined variation amount. Therefore, change of drive force characteristics Is suppressed on the next occasion when the accelerator pedal is depressed, and any discomfort experienced by the driver is further mitigated.

Variations of the speed change pattern of the automatic transmission may also be combined with any of the aforesaid tenth–twelfth embodiments.

By combining variations of the speed change pattern with variations of throttle gain, frequent changes of gear position for approximately the same accelerator operation amount can be avoided. Depending on the accelerator operation amount and vehicle speed, it may occur that there is a lack of drive force on a sloping road, but this problem may be resolved by shifting the speed change timing to lower speed.

The embodiments of this invention in which an exclusive property or privilege is claimed are defined as follows:

We claim:

1. A vehicle drive force controller in which drive force characteristics of a vehicle are modified according to a regional attribute of a region in which said vehicle is travelling, comprising:
   a navigation device that detects the regional attribute of the region in which said vehicle is travelling;
   an acceleration sensor that detects whether an acceleration pedal is depressed;
   a microprocessor programmed to modify the drive force characteristics according to a change of said regional attribute when said accelerator is not depressed, while preventing the drive force characteristics from being modified when said accelerator pedal is depressed; and
   a drive force control device that controls a drive force of said vehicle according to the drive force characteristics determined by said microprocessor.

2. A vehicle drive force controller wherein drive force characteristics of a vehicle are modified according to a regional attribute of a region in which said vehicle is traveling, comprising:
   a navigation device for detecting the regional attribute of the region in which said vehicle is traveling,
   an accelerator operation amount sensor for detecting an operation amount of an accelerator operated by a driver,
   a microprocessor programmed to:
      determine whether or not said accelerator operation amount is zero, and
      determine the drive force characteristics such that the drive force characteristics are modified according to a change of said regional attribute when said accelerator operation amount is zero, and that the drive force characteristics are not modified when said accelerator operation amount is not zero, and
   a drive force control device for controlling a drive force of said vehicle according to the drive force characteristics determined by said microprocessor.

3. A drive force controller as defined in claim 2, wherein said drive force control device comprises an electronic throttle for varying an engine output at a predetermined throttle gain relative to said accelerator operation amount, and said drive force characteristics comprise said throttle gain.

4. A drive force controller as defined in claim 2, wherein said drive force control device comprises an automatic transmission for transmitting an engine rotation according to a predetermined speed change pattern, and said drive force characteristics comprise said speed change pattern.

5. A drive force controller as defined in claim 2, wherein said drive force control device comprises a device for modifying an engine air-fuel ratio, and said drive force characteristic comprise said air-fuel ratio.

6. A vehicle drive force controller wherein drive force characteristics of a vehicle are modified according to a regional attribute of a region in which said vehicle is traveling, comprising:
   a sensor for detecting a traveling condition of said vehicle,
   a microprocessor programmed to:
      determine whether or not said vehicle is in a traffic jam based on the traveling condition, and
      determine the drive force characteristics by modifying said characteristics based on a change of said regional attribute when said vehicle is not traveling in a traffic jam, and prohibiting modification of said characteristics when said vehicle is traveling in a traffic jam, and
   a drive force control device for controlling a drive force of said vehicle according to the drive force characteristics determined by said microprocessor.

7. A vehicle drive force controller as defined in claim 6, wherein said sensor comprises an optical recognition device for detecting whether or not there is another vehicle in front of said vehicle, and said microprocessor is programmed to determine whether or not said vehicle is traveling in a traffic jam based on an output signal from said optical recognition device.

8. A vehicle drive force controller as defined in claim 6, wherein said sensor comprises a sensor for detecting an operating frequency of an accelerator operated by a driver, and said microprocessor is programmed to determine that said vehicle is traveling in a traffic jam when said accelerator operating frequency is greater than a predetermined value.

9. A vehicle drive force controller as defined in claim 6, wherein said sensor comprises a sensor for detecting an operating frequency of a brake operated by a driver, and said microprocessor is programmed to determine that said vehicle is traveling in a traffic jam when brake operating frequency is greater than a predetermined value.

10. A vehicle drive force controller as defined in claim 6, wherein said sensor comprises a device for receiving information relating to the location of traffic jams emitted from outside said vehicle and a device for detecting a present position of said vehicle, and said microprocessor is programmed to determine whether or not said vehicle is traveling is a traffic jam by comparing said present position of said vehicle with said information relating to the location of traffic jams.

11. A vehicle drive force controller as defined in claim 6, wherein said drive force control device comprises an electronic throttle for varying an engine output at a predetermined throttle gain relative to an accelerator operation amount, and said drive force characteristics comprise said throttle gain.

12. A drive force controller as defined in claim 6, wherein said drive force control device comprises an automatic transmission for transmitting an engine rotation according to a predetermined speed change pattern, and said drive force characteristics comprise said speed change pattern.

13. A drive force controller as defined in claim 6, wherein said drive force control device comprises a device for modifying an engine air-fuel ratio, and said drive force characteristics comprise said air-fuel ratio.

14. A vehicle drive force controller wherein drive force characteristics of a vehicle are modified according to a regional attribute of a region in which said vehicle is traveling, comprising:

a navigation device comprising a global positioning system for detecting a present position of said vehicle, and a memory for storing altitude data for an area surrounding said present position, a microprocessor programmed to:
calculate a slope of a road on which said vehicle is traveling from said altitude data for said area surrounding said present position,
select drive force characteristics for a mountainous area when said slope is equal to or greater than a predetermined value,
select drive force characteristics different from those for a mountainous area when said slope is less than said predetermined value, and a drive force control device for controlling a drive force of said vehicle according to the drive force characteristics selected by said microprocessor.

15. A vehicle drive force controller as defined in claim 14, wherein said drive force control device comprises an electronic throttle for varying an engine output at a predetermined throttle gain relative to an accelerator operation amount, said drive force characteristics comprise said throttle gain, and said microprocessor is programmed to select a throttle gain set such that an opening of said electronic throttle is larger when said slope is equal to or greater than a predetermined value than when said slope is less than said predetermined value.

16. A vehicle drive force controller as defined in claim 14, wherein said drive force control device comprises an automatic transmission for transmitting an engine rotation according to a predetermined speed change pattern, said drive force characteristics comprise said speed change pattern, and said microprocessor is programmed to select a speed change pattern set so that a lower gear is applied when said slope is equal to or greater than a predetermined value than when said slope is less than said predetermined value.

17. A vehicle drive force controller wherein drive force characteristics of a vehicle are modified according to a regional attribute of a region in which said vehicle is traveling, comprising:

a navigation device for detecting the regional attribute of the region in which said vehicle is traveling, an accelerator operation amount sensor for detecting an operation amount of an accelerator operated by a driver, a microprocessor programmed to:
calculate a target value of a throttle gain based on said regional attribute,
calculate a new throttle gain obtained by adding a predetermined amount to a present throttle gain such that said present throttle gain approaches said target value in steps, and an electronic throttle for varying an engine output based on said new throttle gain.

18. A vehicle drive force controller as defined in claim 17, wherein said navigation device comprises a global positioning system for detecting a present position of said vehicle, and a memory for storing a map for determining a regional attribute of said present position.

19. A vehicle drive force controller as defined in claim 17, wherein said microprocessor is further programmed not to perform calculation of said new throttle gain when an accelerator operation amount is not zero.

20. A vehicle drive force controller as defined in claim 19, wherein said microprocessor is further programmed to calculate said new throttle gain once each time said accelerator operation amount becomes zero.

21. A drive force controller as defined in claim 17, further comprising an automatic transmission for transmitting an engine rotation according to a predetermined speed change pattern, and said microprocessor is further programmed to vary said speed change pattern according to said regional attribute.

* * * * *